United States Patent
Brugman

(10) Patent No.: US 11,310,135 B2
(45) Date of Patent: Apr. 19, 2022

(54) MANAGING TRANSPORT NETWORK DATA ACCESS

(71) Applicant: TOYOTA MOTOR NORTH AMERICA, INC., Plano, TX (US)

(72) Inventor: Louis Brugman, Frisco, TX (US)

(73) Assignee: TOYOTA MOTOR NORTH AMERICA, INC., Plano, TX (US)

( * ) Notice: Subject to any disclaimer, the term of this patent is extended or adjusted under 35 U.S.C. 154(b) by 0 days.

(21) Appl. No.: 16/439,790

(22) Filed: Jun. 13, 2019

(65) Prior Publication Data

US 2020/0396146 A1 Dec. 17, 2020

(51) Int. Cl.
- H04L 12/26 (2006.01)
- H04W 40/30 (2009.01)
- H04L 9/06 (2006.01)
- H04L 43/0811 (2022.01)

(52) U.S. Cl.
CPC ........ *H04L 43/0811* (2013.01); *H04L 9/0637* (2013.01); *H04W 40/30* (2013.01); *H04L 2209/38* (2013.01)

(58) Field of Classification Search
None
See application file for complete search history.

(56) References Cited

U.S. PATENT DOCUMENTS

| | | | |
|---|---|---|---|
| 6,853,911 B1 * | 2/2005 | Sakarya | G01C 21/32 701/455 |
| 7,133,685 B2 | 11/2006 | Hose et al. | |
| 7,263,368 B2 | 8/2007 | Knauerhase et al. | |
| 7,603,233 B2 | 10/2009 | Tashiro | |
| 8,031,083 B2 | 10/2011 | Sendrowicz | |
| 8,233,896 B2 | 7/2012 | Wehling | |
| 8,706,131 B2 | 4/2014 | Winters | |
| 8,929,198 B2 | 1/2015 | Yousefi et al. | |

(Continued)

FOREIGN PATENT DOCUMENTS

| | | |
|---|---|---|
| CN | 1209887 C | 7/2005 |
| CN | 104836894 B | 2/2018 |

(Continued)

OTHER PUBLICATIONS

Allahviranloo et al., "A fractionally owned autonomous vehicle fleet sizing problem with time slot demand substitution effects", Elsevier, Dec. 25, 2017.

(Continued)

*Primary Examiner* — Gregory B Sefcheck
*Assistant Examiner* — Srinivasa R Reddivalam

(57) ABSTRACT

An example operation may include one or more of determining a transport will lose a data network connection at a target time based on a route plan associated with the transport, determining an estimated amount of network down time until the transport regains the data network connection once the data network connection is lost, responsive to determining the data network connection will be lost and the estimated amount of network down time, invoking an off-network transport mode prior to the target time, responsive to invoking the off-network transport mode, recording one or more data segments of a data service currently used in the transport, and initiating the one or more data segments on a computing device at the target time.

14 Claims, 16 Drawing Sheets

(56) References Cited

U.S. PATENT DOCUMENTS

| | | | |
|---|---|---|---|
| 8,972,573 | B2 | 3/2015 | Piemonte et al. |
| 9,596,565 | B2 | 3/2017 | Huang et al. |
| 9,913,200 | B2 | 3/2018 | Juhasz |
| 9,974,044 | B2 | 5/2018 | Rao et al. |
| 10,015,041 | B2 | 7/2018 | O'Reirdan et al. |
| 2008/0125964 | A1 | 5/2008 | Carani et al. |
| 2008/0177461 | A1 | 7/2008 | Blackwood |
| 2010/0323659 | A1 | 12/2010 | Wehling |
| 2011/0093583 | A1* | 4/2011 | Piemonte .......... H04M 1/72484 709/224 |
| 2012/0023506 | A1* | 1/2012 | Maeckel ................ G06F 9/485 719/318 |
| 2012/0209654 | A1 | 8/2012 | Romagnino et al. |
| 2012/0276847 | A1* | 11/2012 | Peterson ............... G01S 5/0027 455/41.2 |
| 2012/0310739 | A1 | 12/2012 | Watfa et al. |
| 2013/0154800 | A1* | 6/2013 | Holmes ........... G06Q 10/06312 340/10.1 |
| 2013/0155107 | A1* | 6/2013 | Ashour ............. H04N 1/00244 345/633 |
| 2013/0204645 | A1* | 8/2013 | Lehman ................ G06Q 40/08 705/4 |
| 2014/0028477 | A1 | 1/2014 | Michalske |
| 2016/0014194 | A1* | 1/2016 | Kaplinger .......... H04L 67/1097 709/217 |
| 2016/0259778 | A1 | 9/2016 | Cookson et al. |
| 2016/0315832 | A1* | 10/2016 | Hu ......................... H04L 25/20 |
| 2017/0085417 | A1 | 3/2017 | O'Reirdan et al. |
| 2017/0103571 | A1* | 4/2017 | Beaurepaire ....... G01C 21/3667 |
| 2017/0208540 | A1 | 7/2017 | Egner et al. |
| 2017/0264460 | A1* | 9/2017 | Coleman ............. H04L 65/1066 |
| 2018/0018470 | A1* | 1/2018 | Aggarwal ............. G06F 21/604 |
| 2019/0039545 | A1* | 2/2019 | Kumar ................... H04L 67/18 |
| 2020/0186568 | A1* | 6/2020 | Erb ........................ H04L 63/10 |

FOREIGN PATENT DOCUMENTS

| | | |
|---|---|---|
| DE | 19548363 A1 | 6/1996 |
| EP | 1861963 B1 | 6/2011 |
| EP | 2100096 B1 | 4/2016 |
| EP | 2580924 B1 | 10/2017 |
| JP | 5612108 B2 | 10/2014 |
| KR | 101462551 B1 | 11/2014 |
| RU | 2469505 C2 | 12/2012 |
| RU | 2511526 | 8/2014 |

OTHER PUBLICATIONS

Bignami et al., "Introduction: Car-Sharing Evolution and Green Move Project", pp. 1-8 Springer International Publishing, 2017.

Menon et al., "Shared autonomous vehicles and their potential impacts on household vehicle ownership: An exploratory empirical assessment", Article accepted Feb. 16, 2018, International Journal of Sustainable Transportation, 2018, vol. 0, No. 0, 1-12.

Choi et al., 'Priority Integration for Weighted Combinatorial Testing', 2015 IEEE 39th Annual International Computers, Software & Applications Conference, pp. 242-247. (Year: 2015).

* cited by examiner

550

600

700

MANAGING TRANSPORT NETWORK DATA ACCESS

TECHNICAL FIELD

This application generally relates to services for data access to transports, and more particularly, to monitoring transport network data access.

BACKGROUND

Vehicles or transports, such as cars, motorcycles, trucks, planes, trains, etc., generally provide transportation needs to occupants and/or goods in a variety of ways. Functions related to transports may be identified and utilized by various computing devices, such as a smartphone or a computer.

Transports are commonly using data services, such as global positing satellite (GPS), cellular data, third party satellite data, etc., to receive navigation and route instructions, media services and safety services while the transport is in route to a destination.

While traveling in the transport, data services may diminish in quality or be lost altogether for certain periods of time. Identifying and anticipating the loss of such data services may provide a way to optimize the data services during periods of time when no data services are available.

SUMMARY

One example embodiment may provide a method that includes one or more of determining an amount of time a transport will lose a data network connection when the transport is predicted to enter an area associated with the loss of the data network connection, and sending an emergency signal to a third party when the amount of time has passed since the transport has entered the area and there is no alternate path out of the area.

Another example embodiment may include a system that includes a transport, and a server configured to perform one or more of determine an amount of time the transport will lose a data network connection when the transport is predicted to enter an area associated with the loss of the data network connection, and send an emergency signal to a third party when the amount of time has passed since the transport has entered the area and there is no alternate path out of the area.

Still another example embodiment may include a non-transitory computer readable storage medium configured to store instructions that when executed cause a processor to perform one or more of determining an amount of time a transport will lose a data network connection when the transport is predicted to enter an area associated with the loss of the data network connection, and sending an emergency signal to a third party when the amount of time has passed since the transport has entered the area and there is no alternate path out of the area.

Still another example embodiment may include a method that may include one or more of determining a transport will lose a data network connection at a target time based on a route plan associated with the transport, determining an estimated amount of network down time until the transport regains the data network connection once the data network connection is lost, responsive to determining the data network connection will be lost and the estimated amount of network down time, invoking an off-network transport mode prior to the target time, responsive to invoking the off-network transport mode, recording one or more data segments of a data service currently used in the transport, and initiating the one or more data segments on a computing device at the target time.

Still yet a further example embodiment may include a system that includes a transport, and a server configured to perform one or more of determine a transport will lose a data network connection at a target time based on a route plan associated with the transport, determine an estimated amount of network down time until the transport regains the data network connection once the data network connection is lost, responsive to the determination that the data network connection will be lost and the estimated amount of network down time, invoke an off-network transport mode prior to the target time, responsive to the off-network transport mode being invoked, record one or more data segments of a data service currently used in the transport, and initiate the one or more data segments on a computing device at the target time.

Still yet another example embodiment may include a non-transitory computer readable storage medium configured to store instructions that when executed cause the processor to perform one or more of determining a transport will lose a data network connection at a target time based on a route plan associated with the transport, determining an estimated amount of network down time until the transport regains the data network connection once the data network connection is lost, responsive to determining the data network connection will be lost and the estimated amount of network down time, invoking an off-network transport mode prior to the target time, responsive to invoking the off-network transport mode, recording one or more data segments of a data service currently used in the transport, and initiating the one or more data segments on a computing device at the target time.

DETAILED DESCRIPTION

Figure 1A:
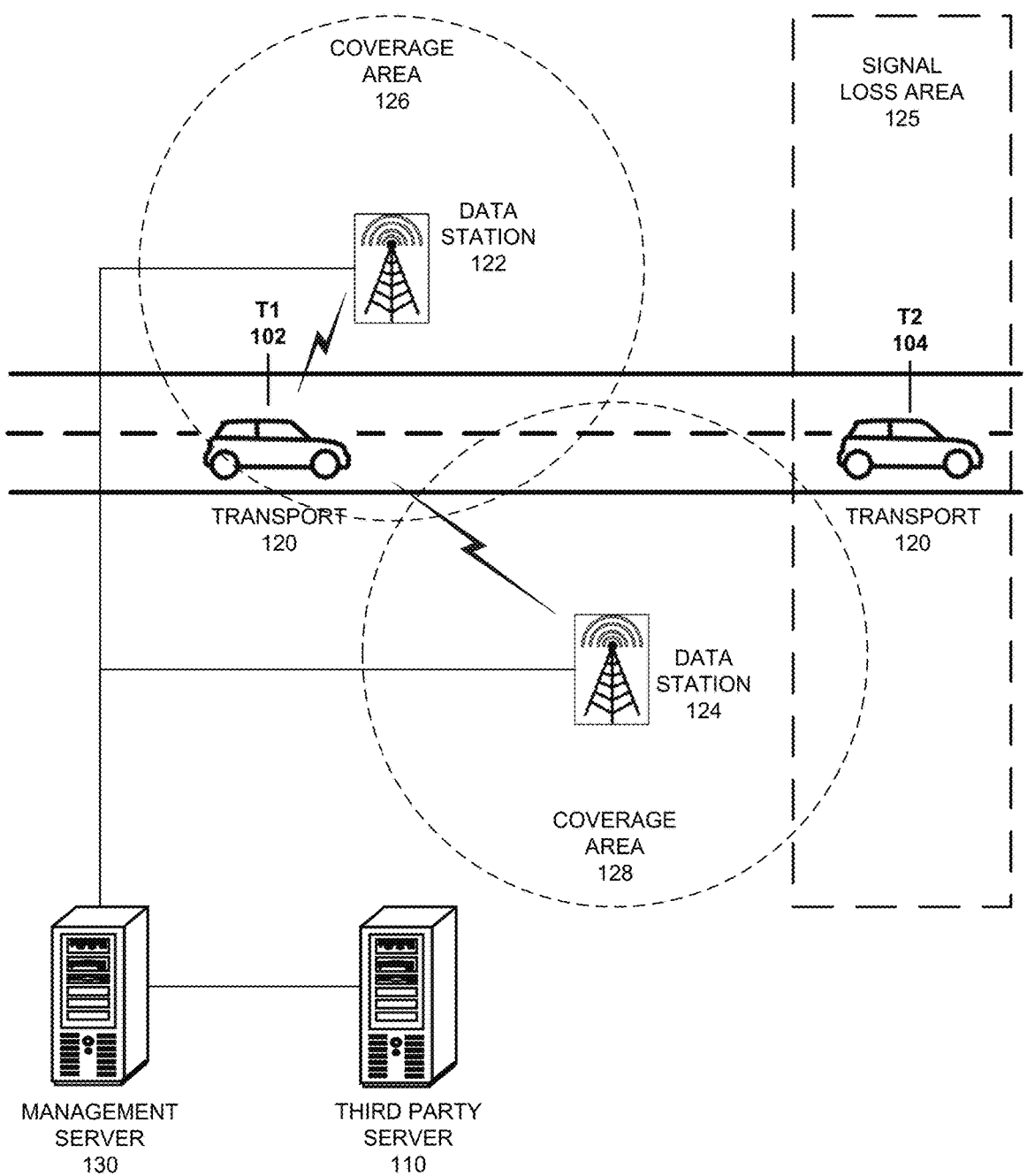
FIG. 1A illustrates a network diagram of a transport data service management configuration, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout least this specification refers to the fact that a particular feature, structure, or characteristic described in connection with the embodiment may be included in at one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments. In the diagrams, any connection between elements can permit one-way and/or two-way communication even if the depicted connection is a one-way or two-way arrow. In the current application, a transport may include one or more of cars, trucks, motorcycles, scooters, bicycles, boats, recreational vehicles, planes, and any object that may be used to transport people and or goods from one location to another.

In addition, while the term "message" may have been used in the description of embodiments, the application may be applied to many types of network data, such as, a packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide methods, systems, components, non-transitory computer readable media, devices, and/or networks, which provide at least one of: a transport (also referred to as a vehicle herein) a data service system, a data service monitoring server, data service stations, a third party server, a blockchain system, other vehicles and/or a user's mobile device, any of which may be part of a management network and/or data distribution system. The vehicle data services may be monitored and audited for changes to such services, such as degradation in wireless data network communications and/or wired communications. In one example, a user profile may be applied to a particular transport/vehicle to authorize a current vehicle event, route plans (i.e., navigation, destinations, etc.) service stops at service stations, and to authorize subsequent vehicle management services. Owners may share ownership of a vehicle through fractional ownership, which may be managed via initial ownership contracts as well as monitored usage and vehicle condition updates which are performed autonomously and periodically.

Within the communication infrastructure, a decentralized database is a distributed storage system which includes multiple nodes that communicate with each other. A blockchain is an example of a decentralized database which includes an append-only immutable data structure (i.e. a distributed ledger) capable of maintaining records between untrusted parties. The untrusted parties are referred to herein as peers, nodes or peer nodes. Each peer maintains a copy of the database records and no single peer can modify the database records without a consensus being reached among the distributed peers. For example, the peers may execute a consensus protocol to validate blockchain storage entries, group the storage entries into blocks, and build a hash chain via the blocks. This process forms the ledger by ordering the storage entries, as is necessary, for consistency. In a public or permission-less blockchain, anyone can participate without a specific identity. Public blockchains can involve cryptocurrencies and use consensus based on various protocols such as proof of work (PoW). On the other hand, a permissioned blockchain database provides a system which can secure interactions among a group of entities which share a common goal, but which do not or cannot fully trust one another, such as businesses that exchange funds, goods, information, and the like. The instant application can function in a permissioned and/or a permissionless blockchain setting.

Smart contracts are trusted distributed applications which leverage tamper-proof properties of the shared or distributed ledger (i.e., which may be in the form of a blockchain) database and an underlying agreement between member nodes which is referred to as an endorsement or endorsement policy. In general, blockchain entries are "endorsed" before being committed to the blockchain while entries which are not endorsed are disregarded. A typical endorsement policy allows smart contract executable code to specify endorsers for an entry in the form of a set of peer nodes that are necessary for endorsement. When a client sends the entry to the peers specified in the endorsement policy, the entry is executed to validate the entry. After validation, the entries enter an ordering phase in which a consensus protocol is used to produce an ordered sequence of endorsed entries grouped into blocks.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits an entry-invocation to an endorser (e.g., peer), and broadcasts entry-proposals to an ordering service (e.g., ordering node). Another type of node is a peer node which can receive client submitted entries, commit the entries and maintain a state and a copy of the ledger of blockchain entries. Peers can also have the role of an endorser, although it is not a requirement. An ordering-service-node or orderer is a node running the communication service for all nodes, and which implements a delivery guarantee, such as a broadcast to each of the peer nodes in the system when committing entries and modifying a world state of the blockchain, which is another name for the initial blockchain entry which normally includes control and setup information.

A ledger is a sequenced, tamper-resistant record of all state transitions of a blockchain. State transitions may result from smart contract executable code invocations (i.e., entries) submitted by participating parties (e.g., client nodes, ordering nodes, endorser nodes, peer nodes, etc.). An entry may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain. There is typically one ledger per channel. Each peer node maintains a copy of the ledger for each channel of which they are a member.

A chain is an entry log which is structured as hash-linked blocks, and each block contains a sequence of N entries where N is equal to or greater than one. The block header includes a hash of the block's entries, as well as a hash of the prior block's header. In this way, all entries on the ledger may be sequenced and cryptographically linked together. Accordingly, it is not possible to tamper with the ledger data without breaking the hash links. A hash of a most recently added blockchain block represents every entry on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain entry log. Because the current state represents the latest key values known to a channel, it is sometimes referred to as a world state. Smart contract executable code invocations execute entries against the current state data of the ledger. To make these smart contract executable code interactions efficient, the latest values of the keys may be stored in a state database. The state database may be simply an indexed view into the chain's entry log, it can therefore be regenerated from the chain at any time. The state database may automatically be recovered (or generated if needed) upon peer node startup, and before entries are accepted.

A blockchain is different from a traditional database in that the blockchain is not a central storage but rather a decentralized, immutable, and secure storage, where nodes must share in changes to records in the storage. Some properties that are inherent in blockchain and which help implement the blockchain include, but are not limited to, an immutable ledger, smart contracts, security, privacy, decentralization, consensus, endorsement, accessibility, and the like.

Example embodiments provide a way for transport data services to be optimized for instances when the data is not readily available or will not be available for a certain period of time. In one example, the vehicle/transport may be identified as using certain data services and traveling in an area where those services may be compromised due to lack of data service support. For instance, the transport may be entering a dead-zone or other area where the data services received from wireless communication signals are not permitted or are not available (i.e., data inconsistencies). In order to provide the vehicle operator with continued services and safety measures, preemptive measures may be taken to ensure data is received and shared prior to experiencing such data inconsistencies. The available vehicle data service may be monitored via one or more monitoring operations, which report upcoming data inconsistencies to a central controller computer device in the vehicle, which in turn, is forwarded to a management server for review and action.

In certain embodiments, a sensor may be located on one or more of the interior of the transport, the exterior of the transport, on a fixed object apart from the transport, and on another transport near to the transport. The sensor may also be associated with the transport's speed, the transport's braking, available data services, the transport's acceleration, fuel levels, service needs, the gear-shifting of the transport, the transport's steering, and the like. The notion of a sensor may also be part of a device, such as a mobile device. Also, sensor information may be used to identify whether the vehicle is operating safely and whether the occupant user has engaged in any unexpected vehicle conditions, such as during the vehicle access period. Vehicle information collected before, during and/or after a vehicle's operation may be identified and stored in a transaction on a shared/distributed ledger, which may be generated and committed to the immutable ledger as determined by a permission granting consortium, and thus in a "decentralized" manner, such as via a blockchain membership group. Each interested party (i.e., company, agency, etc.) may want to limit the exposure of private information, and therefore the blockchain and its immutability can limit the exposure and manage permissions for each particular user vehicle profile. A smart contract may be used to provide compensation, quantify a user profile score/rating/review, apply vehicle event permissions, determine when service is needed, identify a collision and/or degradation event, identify a safety concern event, identify parties to the event, identify changes in the vehicle status, identify changes to available data services, and provide distribution to registered entities seeking access to such vehicle event data. Also, the results may be identified, and the necessary information can be shared among the registered companies and/or individuals based on a "consensus" approach associated with the blockchain. Such an approach could not be implemented on a traditional centralized database.

Data shared and received may be stored in a database which maintains data in one single database (e.g., database server) and generally at one particular location. This location is often a central computer, for example, a desktop central processing unit (CPU), a server CPU, or a mainframe computer. Information stored on a centralized database is typically accessible from multiple different points. A centralized database is easy to manage, maintain, and control, especially for purposes of security because of its single location. Within a centralized database, data redundancy is minimized as a single storing place of all data also implies that a given set of data only has one primary record.

FIG. 1A illustrates a network diagram of a transport data service management configuration, according to example embodiments. Referring to FIG. 1A, the network diagram 100 includes a transport/vehicle 120 traveling towards an intended destination, such as in the event of planned route. The vehicle 120 may be a rented, owned, partially/fractionally owned (i.e., subject to other owners), autonomously driven by a non-present driver, semi-autonomously driven by a driver or driven by a conventional manual vehicle operator. In operation, the vehicle 120 may be driven by a user. The vehicle event (i.e., driving event) may be monitored via on-board sensors, which provide vehicle status data to the on-board computer and/or a user device located in the vehicle/transport 120.

In this example, the transport 120 may be traveling along a particular road and may have active data communications being received and/or sent to certain data stations 122/124. The data stations may be cellular data base stations or may be other forms of data communication sites, such as microcells, femtocells, satellite data sites, private network relays/repeaters, etc., which provide wireless data to the transport via an on-board vehicle computer and/or a mobile device inside the transport. At a first time 'T1' 102, data may be received and sent to the transport 120 while the transport 120 is traveling down a road on the way to an intended destination. The coverage areas 126/128 may provide sufficient data service areas to the transport during its movement along a particular route plan, such as a navigation application plan that was setup prior to a time T1. The management server 130 may be a remote server that identifies the transport 120 and its current route plan, and which may have a database of known areas within the route plan which are likely to not have reliable data service, such as dead zones.

As the transport 120 moves towards a signal loss area 125, at a later anticipate time T2 104, the management server 130 may identify certain operations which could be enacted to optimize the data services during such data inactive areas 125. For example, the navigation data necessary to populate the user interface with route instructions could downloaded at the transport for a period of time and/or length of travel that coincides with the traveling of the transport 120 through the inactive areas. Also, the media data, such as the news, music and/or entertainment segments may be downloaded in advance to populate the user interface(s) in the vehicle with data during the traveling through the signal loss areas 125. Also, the third party server 110 may be used to monitor the transport's route for safety measures, such as sharing data with a third party transport, such as another transport on the road via vehicle-to-vehicle (V2V) communications. This may enable the transport to share updated location information and status information (i.e., data network loss) in the event of an emergency, such as when the vehicle's location is no longer known by the management server 130.

The vehicle may retrieve road conditions, safety information, location information and other data from vehicle sensors affixed to the vehicle. The vehicle sensors may be hardwired to a central controller, or on-board transport computer, or other processor associated with the vehicle, or may instead be providing wireless communications with the central controller of the vehicle's computer via various wireless communication protocols. The data may be transmitted from the central controller/computer, a user's smartphone, and/or via a cellular compatible device, etc. The sensor content and different sensor data types may include one or more of a radio station selection, recorded audio, mobile device usage within the vehicle, telephone calls conducted inside the vehicle, browser history of at least one of the computing devices, purchases conducted via at least one computing device inside the vehicle, movement of the vehicle, navigation of the vehicle, a collision of the vehicle, speed of the transport, acceleration of the vehicle, data network access, diagnostics associated with the transport including battery charge level, gasoline level, oil level, temperature of the vehicle, location of the vehicle, detected traffic near the vehicle, information regarding other vehicles, etc. The sensor data may be collected and stored for analysis and transaction recording.

The types of sensors which may be included with the vehicles may include one or more of movement sensors, sonar sensors, lidar sensors, accelerometers, touch sensors, proximity sensors, temperature sensors, speed sensors, sound sensors, infrared sensors, collision sensors, level sensors, tire pressure sensors, location determination sensors, ultrasonic sensors, camera sensors, activity sensors, chemical sensors, fluid sensors, pressure sensors, optical sensors, biometric sensors, and the like.

As noted previously, the vehicle 120 may be a vehicle operated by a human driver or an autonomous vehicle operated by a computer and/or remote agent designed for users to ride in during a transport event. The vehicle sensor data may be collected via a plurality of the vehicle sensors. The controller device (i.e., on-board computer and/or user smartphone, etc.) may identify the sensor type, sensor identifier and instances of sensor data received for those parameters. The collection of sensor data may create one or more sets of sensor data. For example, sensors S1, S2, S3 ... Sn, may generate sensor data sets SD1, SD2, SD3 ... SDn. Those sensor data sets may include multiple iterations of sensor data over a fixed period of time (e.g., milliseconds, seconds, minutes, hours, etc.) or short instances of extreme measurements, such as only instances of large deviations from expected values to identify, for example, an accident, a hole in the road, braking, extreme conditions or maneuvers, the need for service, etc.

Owners of autonomous/non-autonomous vehicles (or occupants of the vehicles) may register their personal profiles in a shared distributed ledger or other data management system so the information collected during sensor collection efforts may be shared. The smart contract may identify the parties of the agreement, permissions for vehicle occupants, types of data, current profile statuses, sensor thresholds associated with vehicle damages/liability and service needs, and other parameters, such as measures to take in the event of a data network signal loss. The immutability of the sensor data may also be preserved via the shared ledger format of a blockchain.

Figure 1B:
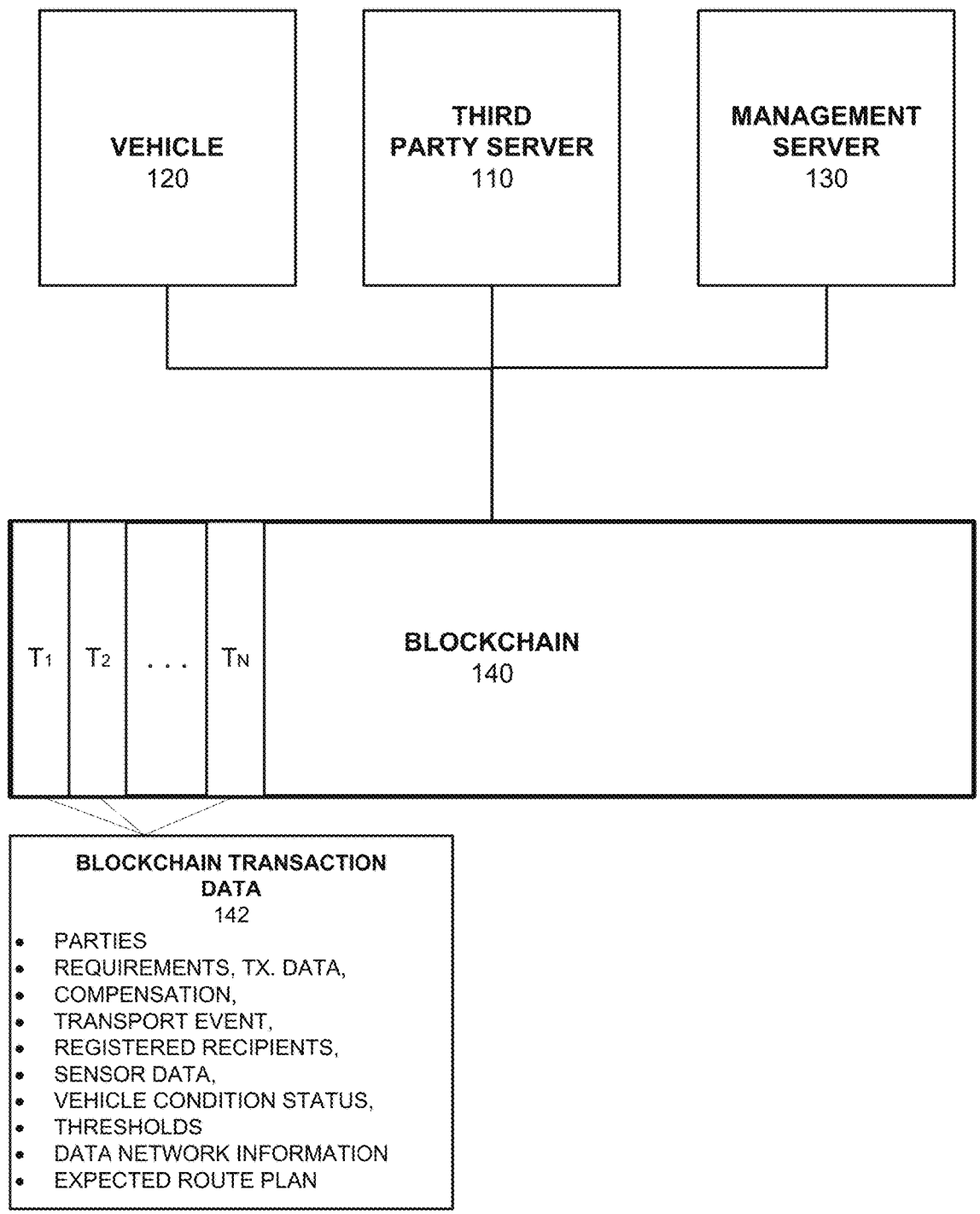
FIG. 1B illustrates a blockchain configuration for storing blockchain transaction data, according to example embodiments.

FIG. 1B illustrates a blockchain configuration for storing blockchain transaction data, according to example embodiments. Referring to FIG. 1B, the example configuration 150 provides for the vehicle 120 and/or a user device associated with the vehicle, a third party server 110, which may provide safety monitoring and other services, and a management server 130, which may provide monitoring and data network management services. The servers may perform sharing of information with a distributed ledger (i.e., blockchain) 140. The server may represent a service provider entity inquiring with a vehicle service provider to share user profile information in the event that a known and established user profile is attempting to rent, use or buy a vehicle with an established rated profile. The server 130 may be receiving and processing data related to a vehicle's network status. As the vehicle usage events occur, the vehicle sensor data may indicate a need for fuel/charge, a maintenance service, a loss of data network access, etc., a smart contract may be used to invoke rules, thresholds, sensor information gathering, etc., which may be used to take preemptive measures to ensure vehicle safety and passenger satisfaction by providing data services during such inactive network access periods of time. The blockchain transaction data 142 is saved for each transaction, such as the access event, the subsequent updates to a vehicle's service status, event updates, etc. The transactions may include the parties, the requirements (e.g., 18 years of age, service eligible candidate, valid driver's license, registered fractional owners, etc.), compensation levels, the distance traveled during the events, the registered recipients permitted to access the event and host a vehicle service, rights/permissions, sensor data retrieved during the vehicle event operation to log details of the next service event and identify a vehicle's condition status, and thresholds used to make determinations about whether the data network access will be lost and actions to take to avoid passenger dissatisfaction and to optimize vehicle control and safety.

Figure 1C:
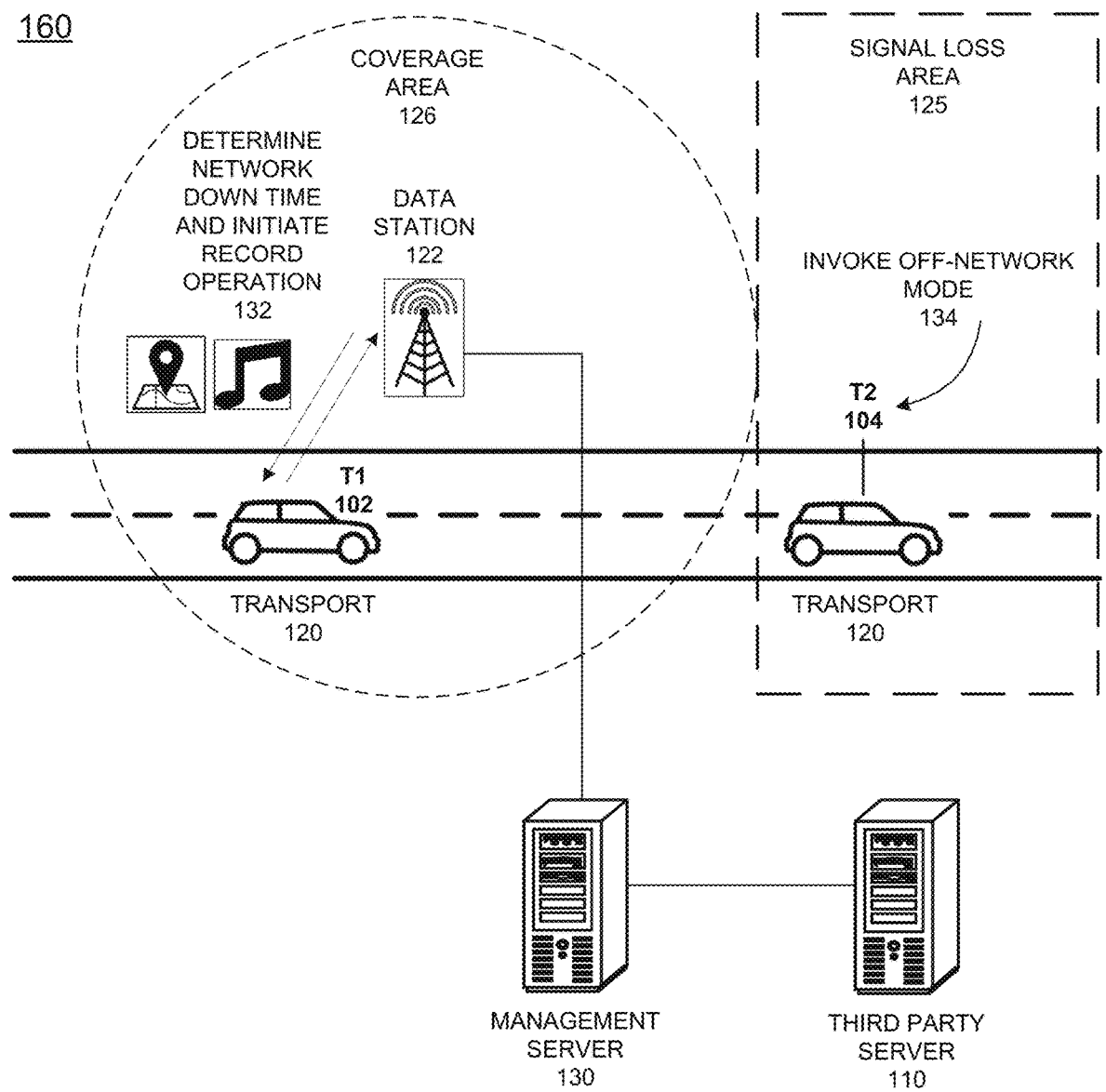
FIG. 1C illustrates a transport data service management configuration, according to example embodiments.

FIG. 1C illustrates a transport data service management configuration 160, according to example embodiments. Referring to FIG. 1C, the transport 120 may be user operated or autonomously driven (driverless) transport which is used by a current user, which may be operating a smartphone device to assist with transport usage operations, such as navigation, rental agreement, presence tracking, etc. The configuration 160 includes the user having access to the vehicle 120, such as, for a route plan to a destination, which is managed via the vehicle management server 130 and/or a third party server 110. The vehicle management server 130 may receive updates about the vehicle's status, such as a current network data access condition indicating the vehicle's position, the data network's data access status with the vehicle, a future route of the vehicle and whether the current route and future location, such as at a later time 'T2' 104, will provide ongoing data network access.

In this example, a transport 120 may be identified at a first time T1 102 as having data network access to a particular data station 122 via a particular coverage area 126. The management server 130 may examine the route plan associated with a current navigation route application being operated inside the transport 120. At the current time T1, the management server 130 may identify that the transport at a time T2 104, will be entering a signal loss area 125. As a result, the management server 130 may identify data usage history records of the transport and/or the passengers' via their personal computing devices. For instance, when a loss of signal area is approaching, as identified from a current travel path and/or travel plan, then the network downtime anticipated may be estimated, the data services used in the past and in the present time T1, may be identified and used as the basis for performing specific remedial measures, such as downloading/recording 132 data segments of navigation application data, media data, other Internet related data, such as news, videos, weather updates, traffic information, etc. The data segments may be estimated and downloaded to correspond to the estimated down time, for example, 20 minutes of media may be recorded to be played back at a later time, when the network is identified as being unavailable in the area the transport will be traveling. If the amount of network downtime estimated is 20 minutes, then 20 minutes of media may be downloaded and stored as well as 20 minutes of navigation data and instructions based on an amount of distance the transport may travel at a current speed limit and/or a future speed limit. This preemptive measure of downloading/recording certain data for playback purposes, during a network downtime, may create an instance where the passengers are not even aware of the loss in network data. However, the loss in network data may still cause the management server 130 and third party server 110 to lose track of the location of the transport during the off-network period of time. In certain examples, the transport 120 may still be able to communicate with the network via other vehicles or via intermittent updates which are performed when operating in an off-network mode of operation 134.

Figure 2A:
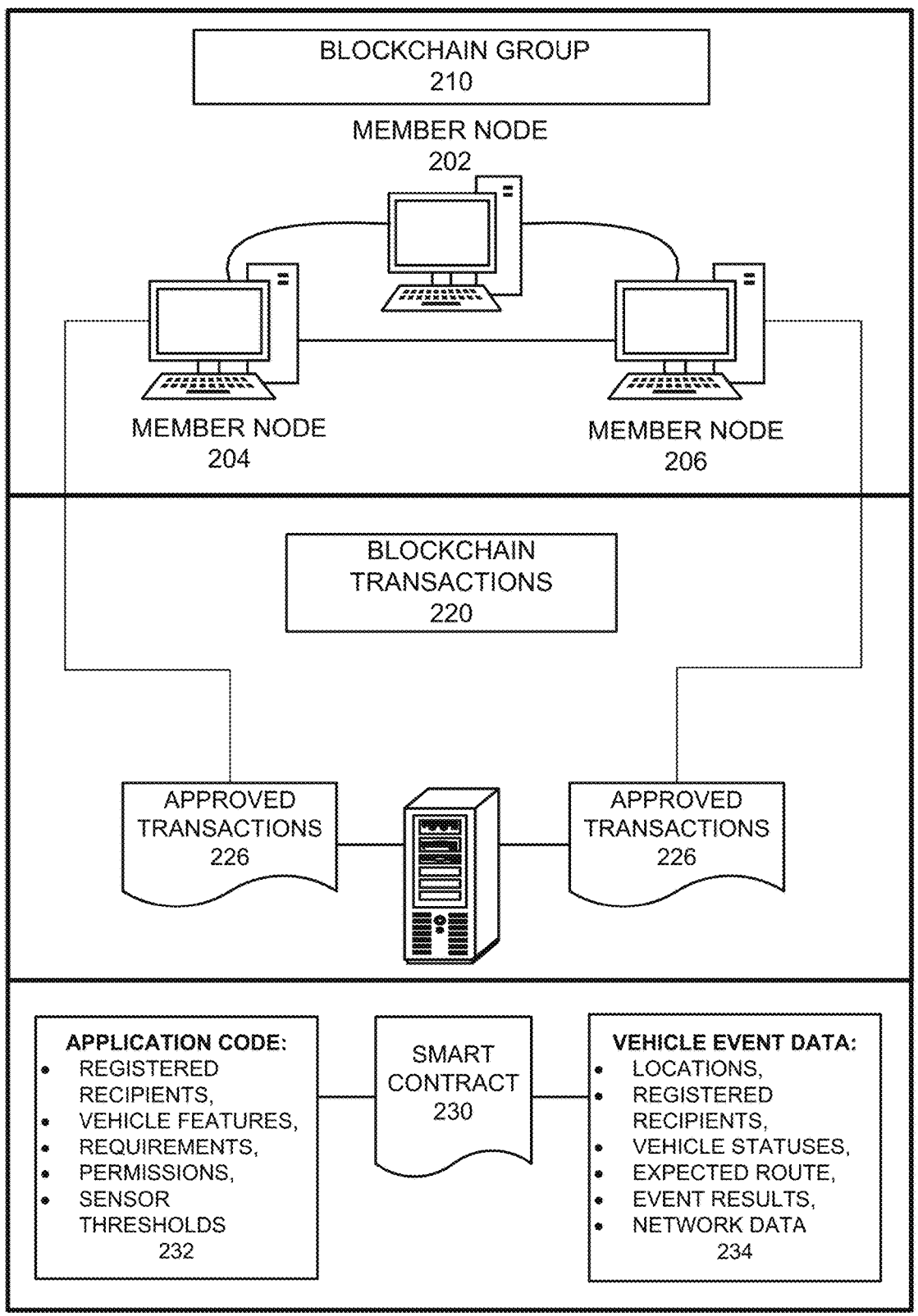
FIG. 2A illustrates an example peer node configuration, according to example embodiments.

FIG. 2A illustrates a blockchain architecture configuration 200, according to example embodiments. Referring to FIG. 2A, the blockchain architecture 200 may include certain blockchain elements, for example, a group of blockchain member nodes 202-206 as part of a blockchain group 210. The blockchain group may be permissioned or permissionless, a permissioned blockchain is not accessible to all parties but only to those members with permissioned access to the blockchain data. The blockchain nodes participate in a number of activities, such as blockchain entry addition and validation process (consensus). One or more of the blockchain nodes may endorse entries based on an endorsement policy and may provide an ordering service for all blockchain nodes. A blockchain node may initiate a blockchain action (such as an authentication) and seek to write to a blockchain immutable ledger stored in the blockchain, a copy of which may also be stored on the underpinning physical infrastructure.

The blockchain transactions 220 are stored in memory of computers as the transactions are received and approved by the consensus model dictated by the members' nodes. Approved transactions 226 are stored in current blocks of the blockchain and committed to the blockchain via a committal procedure which includes performing a hash of the data contents of the transactions in a current block and referencing a previous hash of a previous block. Within the blockchain, one or more smart contracts 230 may exist that define the terms of transaction agreements and actions included in smart contract executable application code 232. The code may be configured to identify whether a vehicle is receiving certain services, such as data network access and whether the access will be lost for a temporary period of time. For example, when a vehicle is being used for a period of time, the sensor data and/or monitoring data may be used to trigger a condition as to whether data network access may be lost based on known data service areas, a current location of the vehicle, and other parameters, such as a known travel route of the vehicle. Those parameters may be identified as being above/below a particular threshold for a particular period of time, then the result may be that data is collected and stored prior to the data network loss of signal to provide seamless data services during the data outage period. Also, an alert may be sent to certain managing parties (i.e., vehicle owner, vehicle operator, managing server, third party server, etc.) so the data network condition status can be identified and stored for reference. Also, the vehicle sensor data collected may be based on types of sensor data used to collect information about a vehicle's status. The sensor data may also be the basis for the vehicle event data 234, such as a location(s) to be traveled, an average speed, a top speed, acceleration rates, whether there were any collisions, whether the expected route taken, what is the next destination, whether safety measures are in place, whether the vehicle can support the average passenger and cargo loads, whether the roads driven are suitable for such a transport, whether network data access will be available, etc. All such information may be the basis of smart contract terms 230, which are then stored in a blockchain. For example, sensor thresholds and location distance thresholds stored in the smart contract can be used as the basis for whether the vehicle is going to need data service remedial measures in the near future.

Figure 2B:
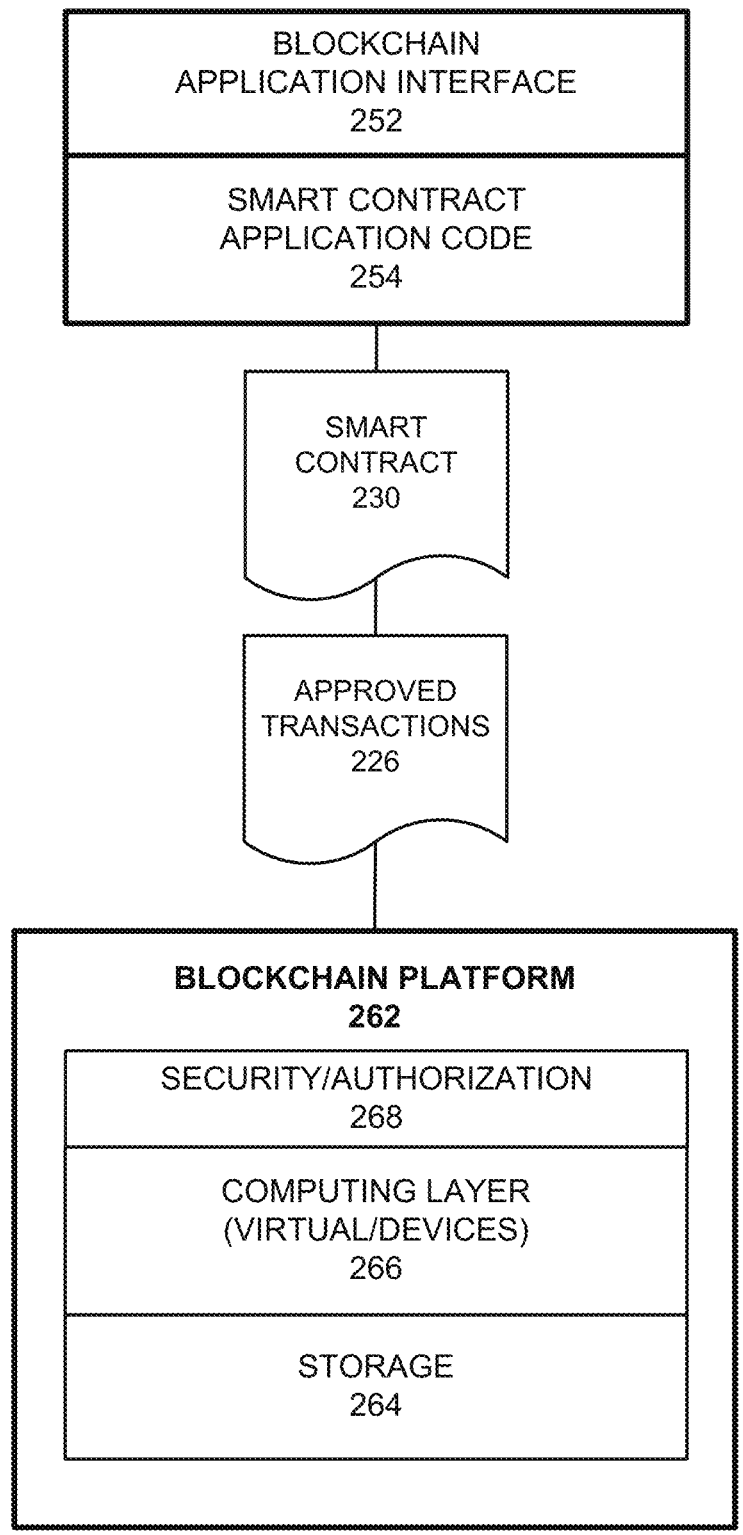
FIG. 2B illustrates a shared ledger configuration, according to example embodiments.

FIG. 2B illustrates a shared ledger configuration, according to example embodiments. Referring to FIG. 2B, the blockchain logic example 250 includes a blockchain application interface 252 as an API or plug-in application that links to the computing device and execution platform for a particular transaction. The blockchain configuration 250 may include one or more applications which are linked to application programming interfaces (APIs) to access and execute stored program/application code (e.g., smart contract executable code, smart contracts, etc.) which can be created according to a customized configuration sought by participants and can maintain their own state, control their own assets, and receive external information. This can be deployed as an entry and installed, via appending to the distributed ledger, on all blockchain nodes.

The smart contract application code 254 provides a basis for the blockchain transactions by establishing application code which when executed causes the transaction terms and conditions to become active. The smart contract 230, when executed, causes certain approved transactions 226 to be generated, which are then forwarded to the blockchain platform 262. The platform includes a security/authorization 268, computing devices which execute the transaction management 266 and a storage portion 264 as a memory that stores transactions and smart contracts in the blockchain.

The blockchain platform may include various layers of blockchain data, services (e.g., cryptographic trust services, virtual execution environment, etc.), and underpinning physical computer infrastructure that may be used to receive and store new entries and provide access to auditors which are seeking to access data entries. The blockchain may expose an interface that provides access to the virtual execution environment necessary to process the program code and engage the physical infrastructure. Cryptographic trust services may be used to verify entries such as asset exchange entries and keep information private.

The blockchain architecture configuration of FIGS. 2A and 2B may process and execute program/application code via one or more interfaces exposed, and services provided, by the blockchain platform. As a non-limiting example, smart contracts may be created to execute reminders, updates, and/or other notifications subject to the changes, updates, etc. The smart contracts can themselves be used to identify rules associated with authorization and access requirements and usage of the ledger. For example, the information may include a new entry, which may be processed by one or more processing entities (e.g., processors, virtual machines, etc.) included in the blockchain layer. The result may include a decision to reject or approve the new entry based on the criteria defined in the smart contract and/or a consensus of the peers. The physical infrastructure may be utilized to retrieve any of the data or information described herein.

Within smart contract executable code, a smart contract may be created via a high-level application and programming language, and then written to a block in the blockchain. The smart contract may include executable code which is registered, stored, and/or replicated with a blockchain (e.g., distributed network of blockchain peers). An entry is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A smart contract executable code may include the code interpretation of a smart contract, with additional features. As described herein, the smart contract executable code may be program code deployed on a computing network, where it is executed and validated by chain validators together during a consensus process. The smart contract executable code receives a hash and retrieves from the blockchain a hash associated with the data template created by use of a previously stored feature extractor. If the hashes of the hash identifier and the hash created from the stored identifier template data match, then the smart contract executable code sends an authorization key to the requested service. The smart contract executable code may write to the blockchain data associated with the cryptographic details.

Figure 3A:
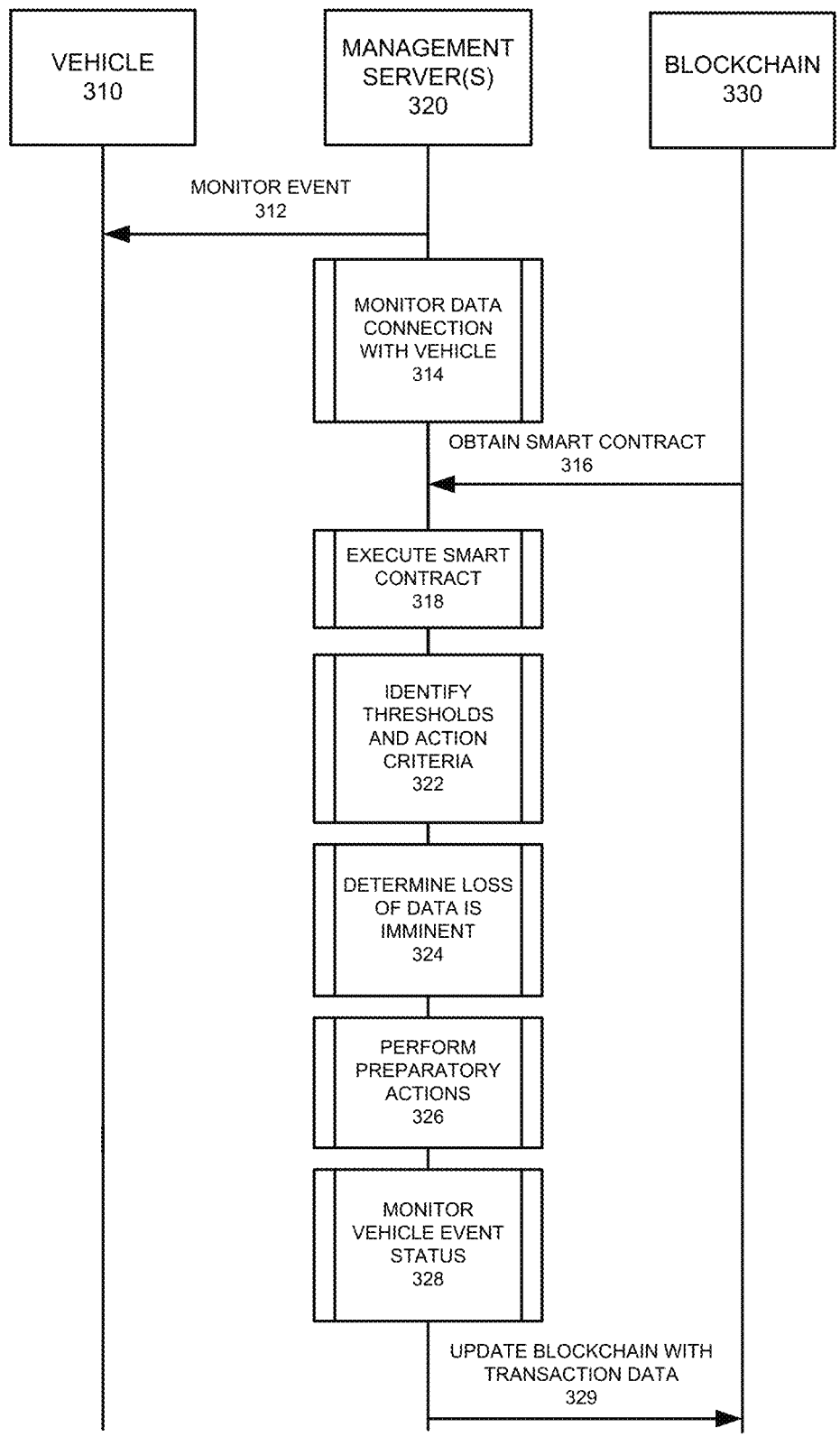
FIG. 3A illustrates a system diagram of a transport data service management configuration, according to example embodiments.

FIG. 3A illustrates a system diagram of a transport data service management configuration, according to example embodiments. Referring to FIG. 3A, the system 300 provides a transport/vehicle 310, which may be requested, accessed and operated via a user, and which is then monitored 312 for an event status, which may be managed by a management server 320. The server 320 may identify a particular vehicle 310 encountering certain changes, such as being located in areas where data network access is unstable, etc., all of which are detected via sensor data and/or signal quality data that is monitored for data signal degradation and related changes 314. For example, the signal may be lost intermittently and the number of signal loss events over a period of time may initiate a data loss preparation scenario, which causes certain data segments to be collected and stored. The user profile of the user entity using the vehicle may also be retrieved to apply to the vehicle 310 along with a set of defined vehicle features which are required/prohibited during operation, such as usage only during defined periods. The procedure for monitoring and preparing for data signal loss with regard to the vehicle may be managed by an obtained smart contract 316 associated with a blockchain 330. The ongoing monitoring of the condition level of the vehicle may be based on sensor data, such as a data connection sensor which is used to measure signal loss levels, a number of data loss events over a period of time, etc. The sensor data may provide periodic updates to the server 320 to indicate whether compliance with a data connection is lost or is likely to be lost in the near future. Also, map data associated with the near travel paths of the vehicle may be referenced to identify locations where data network access is known to be non-existent or intermittent and unreliable.

The smart contract may be executed 318 to enable a new vehicle data network monitoring event. For example, certain data network access thresholds 322 may indicate that a data network access loss event is about to occur. For example, the threshold may be a number of signal loss events in a period of time and/or a certain distance to a known signal loss area, which when the vehicle travels within a distance that is less than the minimum distance threshold, then a signal loss remedial action may take place to prepare for the signal loss (i.e., download and store data). The threshold may also be based on time, since the vehicle may be identified as traveling a certain distance away from the signal loss area at a certain time and thus the amount of time to download and store data may be estimated as a preparatory amount of time to prepare for the signal loss event. Once the decision is made that the data loss is imminent and about to occur 324, the vehicle may perform preparatory actions 326, such as begin accessing the stored data, stop attempting to download data until a period of time expires, attempt to notify other vehicles via V2V communications about its current location, date, time, and its expected route and signal connection reestablishment time. Other actions may include attempting to reconnect periodically to the data network, periodically attempting to send a low data rate probe signal to provide safety location information for safety measures, etc. As the time passes the vehicle event status may be continuously monitored for data network access 328. The reconnection time and vehicle status may be shared upon reconnection to ensure the vehicle is still operating safely and any sensor data may be reported to provide a condition status of the vehicle. The information may be updated in the blockchain 330 as an update transaction 329.

Figure 3B:
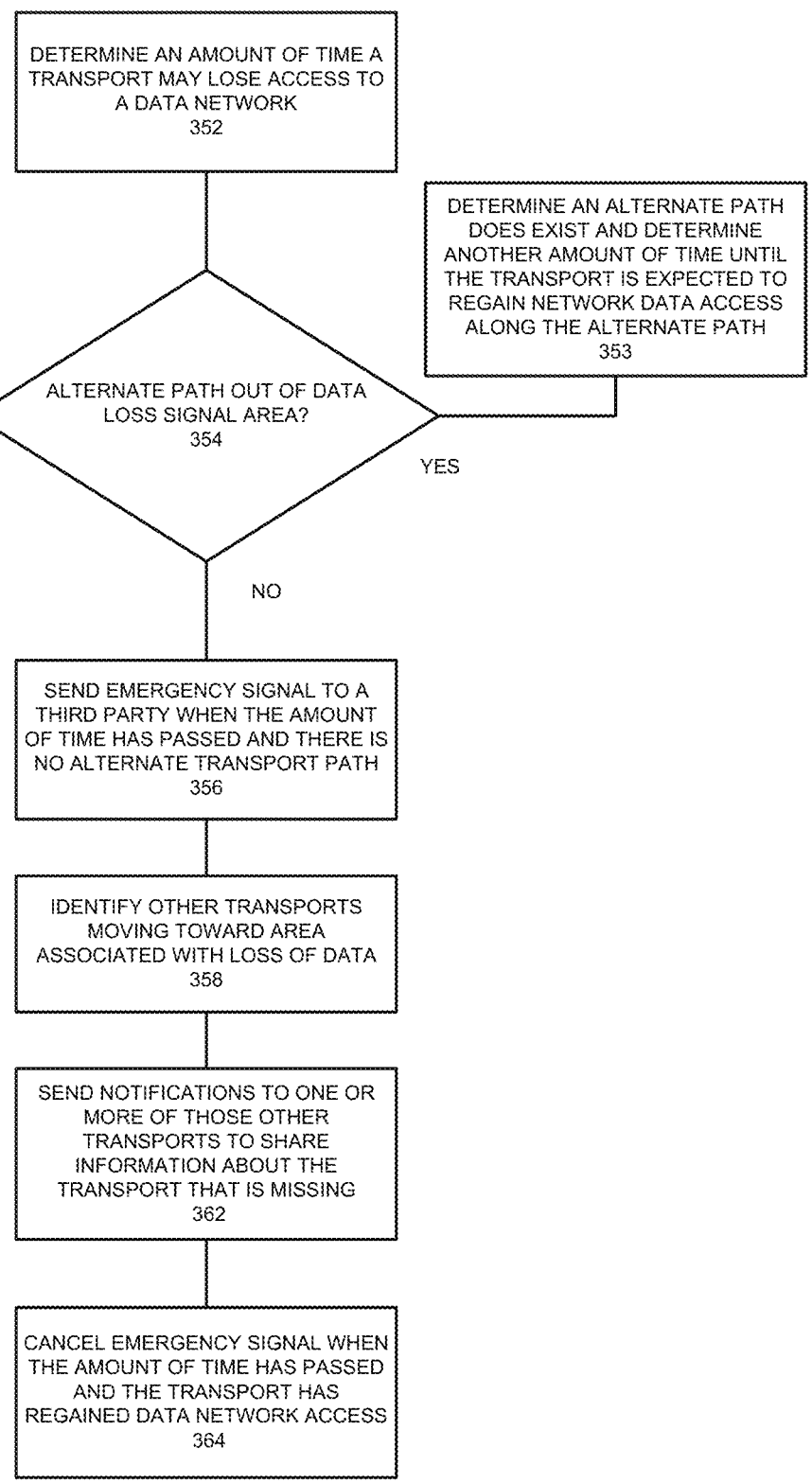
FIG. 3B illustrates a flow diagram of a transport data service management configuration, according to example embodiments.

FIG. 3B illustrates a flow diagram of a transport data service management configuration, according to example embodiments. Referring to FIG. 3B, the flow diagram process 350 provides determining an amount a transport will lose access to a data network connection when the transport is predicted to enter an area associated with a loss of the data network connection 352. If the transport has a navigation route plan being implemented via a navigation application, then the anticipated route is identified along any area which are identified as not having data network access. In the event that an alternate path exists 354 out of the area identified as not having data network access, then the alternate path is examined for its distance and an estimated time is identified as to when the transport will regain data network access assuming the alternate path is taken 353. If the alternate path route is identified as taking more time than the original route plan, then the transport may be deemed to be still traveling without the need for an emergency alert. If the alternate path route is identified as taking less time than the original route plan, then the emergency alert may be created and sent after an estimated time associated with the original route plan has passed and the vehicle has not reestablished communication via the data network. In the event that the vehicle has not reestablished communication after the anticipate communication time has passed, based on the route plan, an emergency signal is sent to a third party server 356, when the amount of time has passed since the transport has entered the area and there is no alternate transport path out of the communication-less area. When an alternate path out of the area does exist, the process includes determining the amount of time until the transport regains the data network connection when the transport is moving along the alternate path since it may be assumed the transport has traveled down the alternate route instead of the primary or first identified route.

As another way to reduce risks and attempt to maintain control over a particular transport, the process may include identifying one or more other transports moving toward the area associated with the loss of the data network connection 358 and/or moving in the same direction or a different direction as the transport, and sending a notification to one or more of the other transports, and the notification may include one or more of information related to a type of the transport, a last known location of the transport, and a potential issue related to the transport. This provides a way to share the transport information with other transports so the transport can be identified if the transport is observed or sensed by one of the transports that is tagged as a potential assistant when the notifications are received by those other transports. For example, if the notification is received by one or more other transports, then those transports may create an alert that identifies other transports/vehicles and shares information with the management server when other vehicles are identified. Then, the missing transport may be identified 362 and such information can be shared with other transports and/or the management server. The notification may include a requested action to be taken by the one or more of the other transports, such as transmit a communication to other transports, such as the missing transport, and take images of other transports, etc. The process also includes cancelling the emergency signal when the amount of time has passed and the transport regains the data network connection 364. There may also be a period of time where the transport can attempt to regain communication with the data network beyond the initial estimated time period of network reestablishment. For instance, if traffic, inclement weather, or other conditions are known to have occurred, the period of time may be extended by an additional period of time prior to taking emergency alert measures. The results of the transport monitoring may be included in a blockchain transaction that has the amount of time and the third party to which the information is being shared (i.e., tracking entity).

Figure 3C:
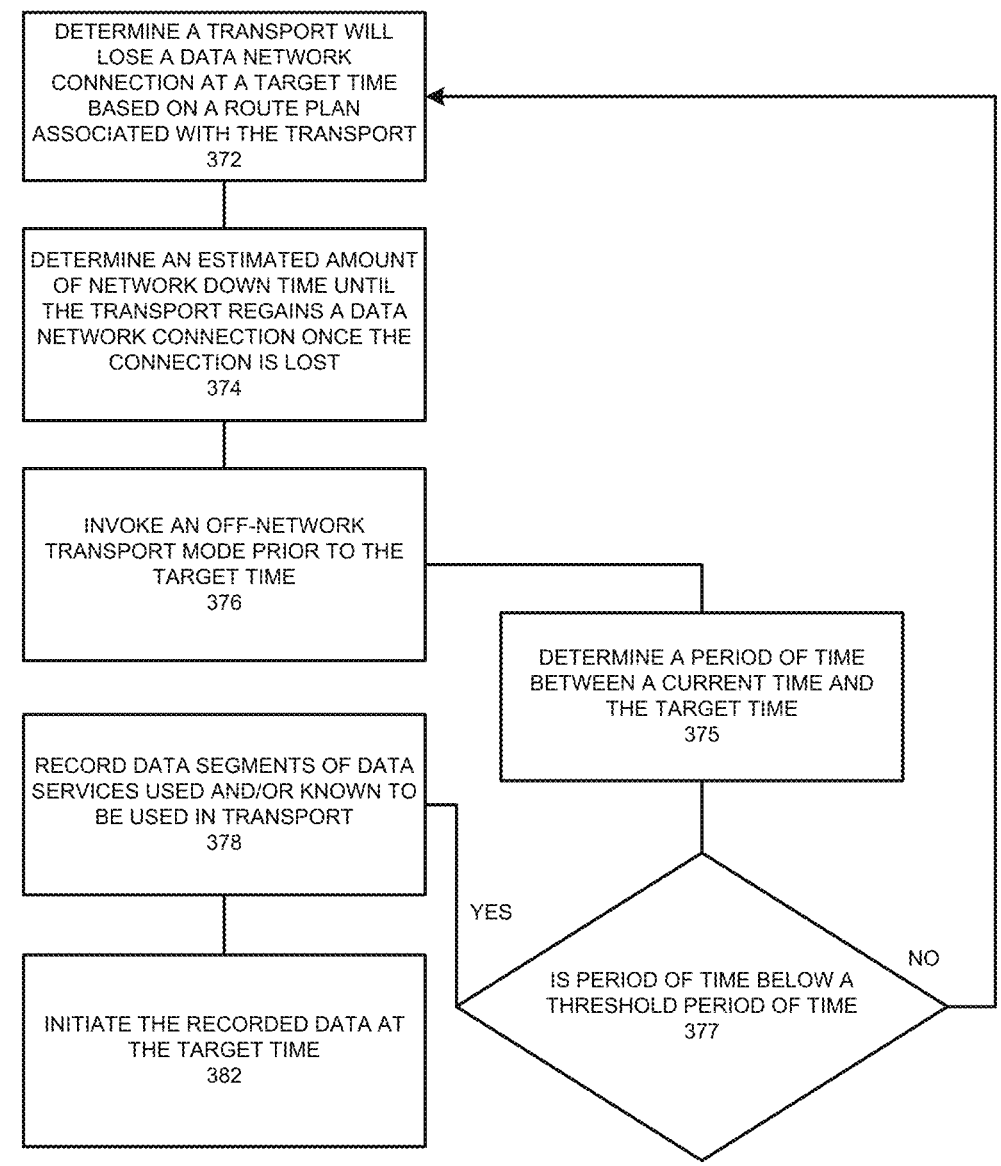
FIG. 3C illustrates a flow diagram of another a transport data service management configuration, according to example embodiments.

FIG. 3C illustrates a flow diagram of another a transport data service management configuration, according to example embodiments. Referring to FIG. 3C, the flow diagram 370 provides a process with determining a transport will lose a data network connection at a target time based on a route plan associated with the transport 372. The determination may be based on the known locations of data signal loss areas which are going to be encountered by a transport based on its current route plan. The process may also include determining an estimated amount of network down time until the transport regains the data network connection once the data network connection is lost 374. The down time may be based on the distance of the signal loss area, the speed limit of the signal loss area, the transport's current average speed, etc. The target time may be used as a basis for invoking an off-network transport mode 376, which may be based on a set amount of time before the target time begins, such as 10 minutes, etc. That period of time may mature when a threshold period of time is identified 377. For example, once within 10 minutes of the target time. The threshold time is dynamic and is based on how much data is needed to offset the down time so as not to interrupt the content displayed, played and/or consumed during the transport down time. For example, if 20 minutes of recorded media is required to offset a 20 minute down time, then the time it takes to download the 20 minutes of media (e.g., five minutes) is the amount of time set as the threshold time. The set amount of time may be a buffer time between the current time and the target time 375 used to initiate the recording of data segments for the applications which are known to be used by the transport and the passengers, such as media, navigation, broadcast data, etc., depending on the particular passengers. The threshold time is the amount of time compared to the set amount of time to know when to start recording. The recordings may then be performed 378, and the amount of data recorded and the types of data recorded are based on the previously used applications and the estimated amount of down time. For example, if the amount of down time is 30 minutes, then the recorded data segments may be at least 30 minutes long to provide data and media to the passengers during the down time. Once the target time matures, the recorded data may be initiated 382 so the passengers may receive the data on one or more display interfaces, audio devices, computing devices, etc. In another example, if another transport is entering the dead zone prior to the current transport, then the another transport may be relied upon to share data via direct V2V communication to provide safety communication about the transport's whereabouts, and/or to share content between the transports to alleviate the network connection loss. For example, the another transport may share downloaded content, navigation instructions, etc., directly with the transport when no network connection is present.

The process may also include determining a future location of the transport will have inoperative access to the data network, determining a period of time between a current time and the target time, and when the period of time is below a threshold period of time (i.e., an amount of time to secure data is running out), then a recording of one or more data segments of data services may be recorded. The priority for determining which sources of data may be based on a weighted function of how often an application is used, how recent an application was used and how important an application may be, such as navigation needed to assist the driver being more important that other types of data, such as media/entertainment. Those applications which qualify for higher priority may be downloaded first before any other application data, which may or may not be used during the network down time. The process may also include determining the threshold period of time based on a type of data (e.g., audio, video, navigation map data) associated with the one or more data segments and an amount of data required to occupy the estimated amount of time until the transport regains the data network connection.

In another example, the process may include determining a current map position and a future map position of the transport based on the route plan, identifying portions of the map between the current map position and the future map position which are known to have failed data network connections, and determining the estimated amount of network down time based on distances associated with the identified portions of the map. The loss of the data network connection may be associated with a lost signal due to a failure with one or more of the data signal, the network, and the transport. The process may also include determining a network connection is available after the target time, determining the estimated amount of network down time is still active, downloading a new data segment of data services previously used in the transport, and initiating the new data segment on the computing device during a break period in the recorded one or more data segments. This permits the downloaded content to be consumed by the user device or the vehicle computing device while other data segments are downloaded. When committing the data to memory, the process may include retrieving a smart contract from a distributed ledger, invoking the smart contract when the transport is determined to lose the data network connection at the target time, and determining, from the smart contract, the estimated amount of network down time based on the route plan. The process may also include creating a blockchain transaction with a date associated with the lost data network connection, a time the transport lost access to the data network, a time the transport regained access to the data network, a location of the transport prior to losing access to the data network, a location of the transport after regaining access to the data network, and storing the blockchain transaction in the distributed ledger. Third parties may seek to identify data about the vehicle from the blockchain during an audit procedure.

Figure 4A:
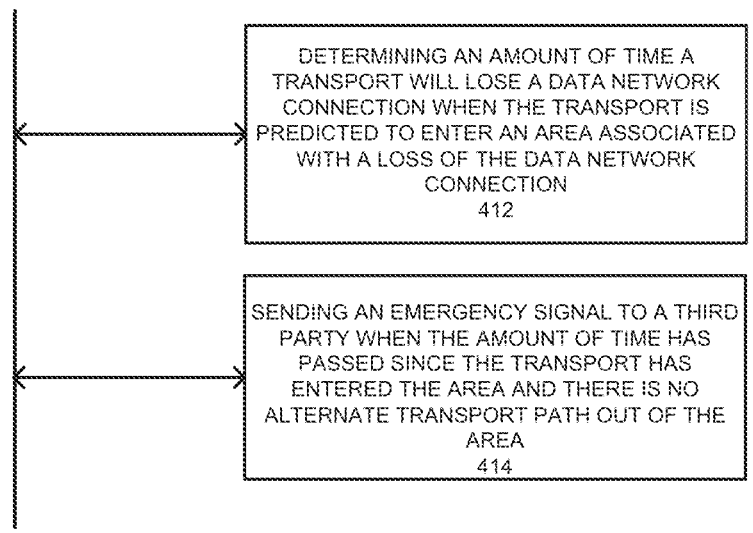
FIG. 4A illustrates a transport data service management configuration flow diagram, according to example embodiments.

FIG. 4A illustrates a transport data service management configuration flow diagram, according to example embodiments. Referring to FIG. 4A, the example process 400 includes determining an amount of time a transport will lose a data network connection when the transport is predicted to enter an area associated with a loss of the data network connection 412, and sending an emergency signal to a third party when the amount of time has passed since the transport has entered the area and there is no alternate transport path out of the area 414.

Figure 4B:
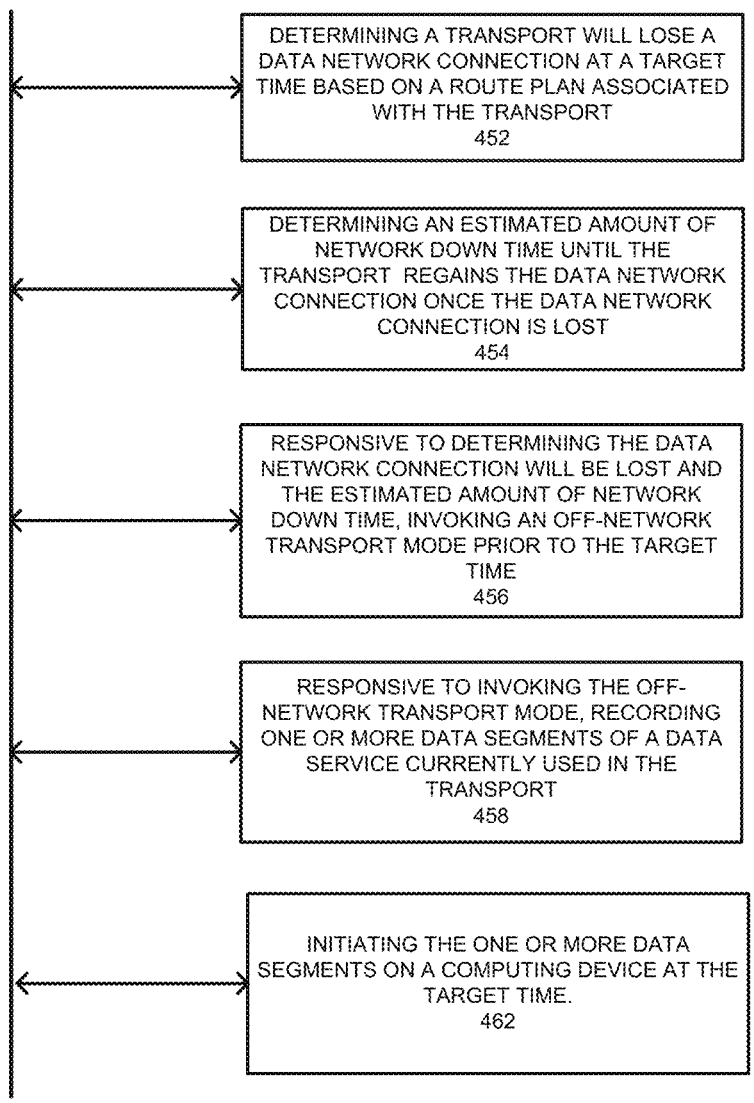
FIG. 4B illustrates another transport data service management configuration flow diagram, according to example embodiments.

FIG. 4B illustrates another transport data service management configuration flow diagram, according to example embodiments. Referring to FIG. 4B, the process 450 includes determining a transport will lose a data network connection at a target time based on a route plan associated with the transport 452, determining an estimated amount of network down time until the transport regains the data network connection once the data network connection is lost 454, responsive to determining the data network connection will be lost and the estimated amount of network down time, invoking an off-network transport mode prior to the target time 456, responsive to invoking the off-network transport mode, recording one or more data segments of a data service currently used in the transport 458, initiating the recorded one or more data segments on a computing device at the target time 462.

Figure 4C:
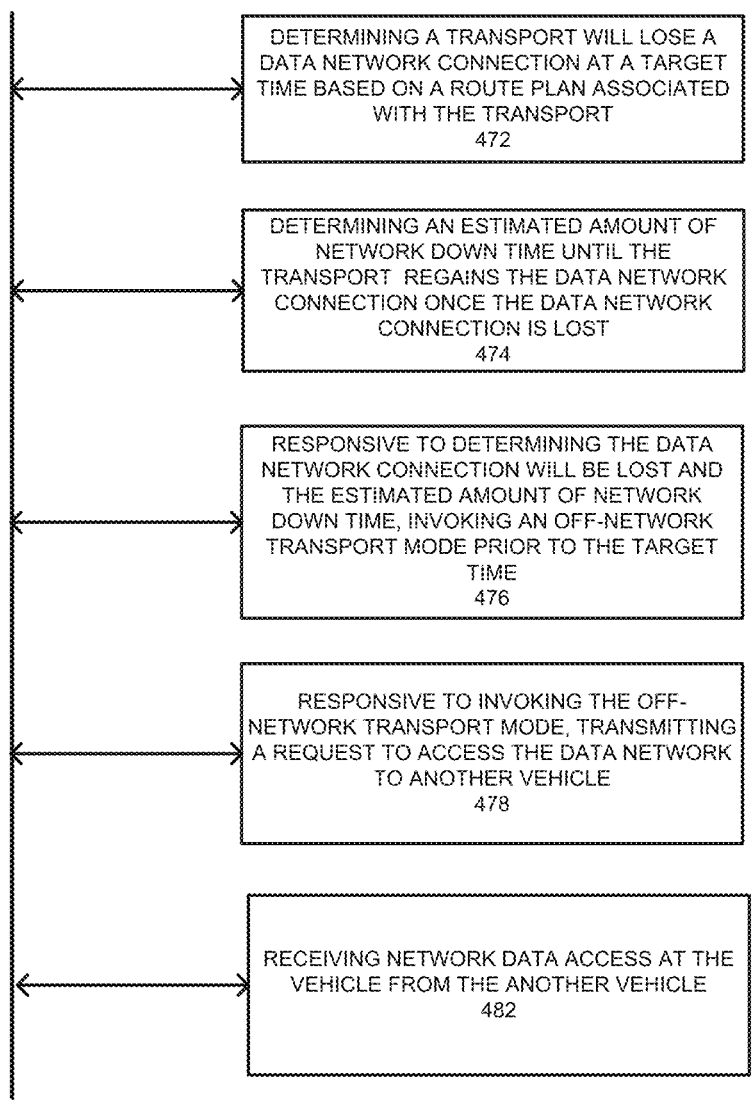
FIG. 4C illustrates yet another a transport data service management configuration, according to example embodiments.

FIG. 4C illustrates yet another a transport data service management configuration, according to example embodiments. Referring to FIG. 4C, the process 470 includes determining a transport will lose a data network connection at a target time based on a route plan associated with the transport 472, determining an estimated amount of network down time until the transport regains the data network connection once the data network connection is lost 474, responsive to determining the data network connection will be lost and the estimated amount of network down time, invoking an off-network transport mode prior to the target time 476, responsive to invoking the off-network transport mode, transmitting a request to access the data network to another vehicle 478, and receiving network data access at the vehicle from the another vehicle 482.

According to other embodiments, a voice assistant may be setup on the transport computing device. The voice assistant may be configured to receive and process voice commands which invoke certain actions, such as commands for the transport to perform an automated task. Such tasks may invoke transactions in the blockchain, such as services for the transport, services for the user of the transport and other actions necessary to maintain a user's schedule and/or optimal management of the transport.

Figure 5A:
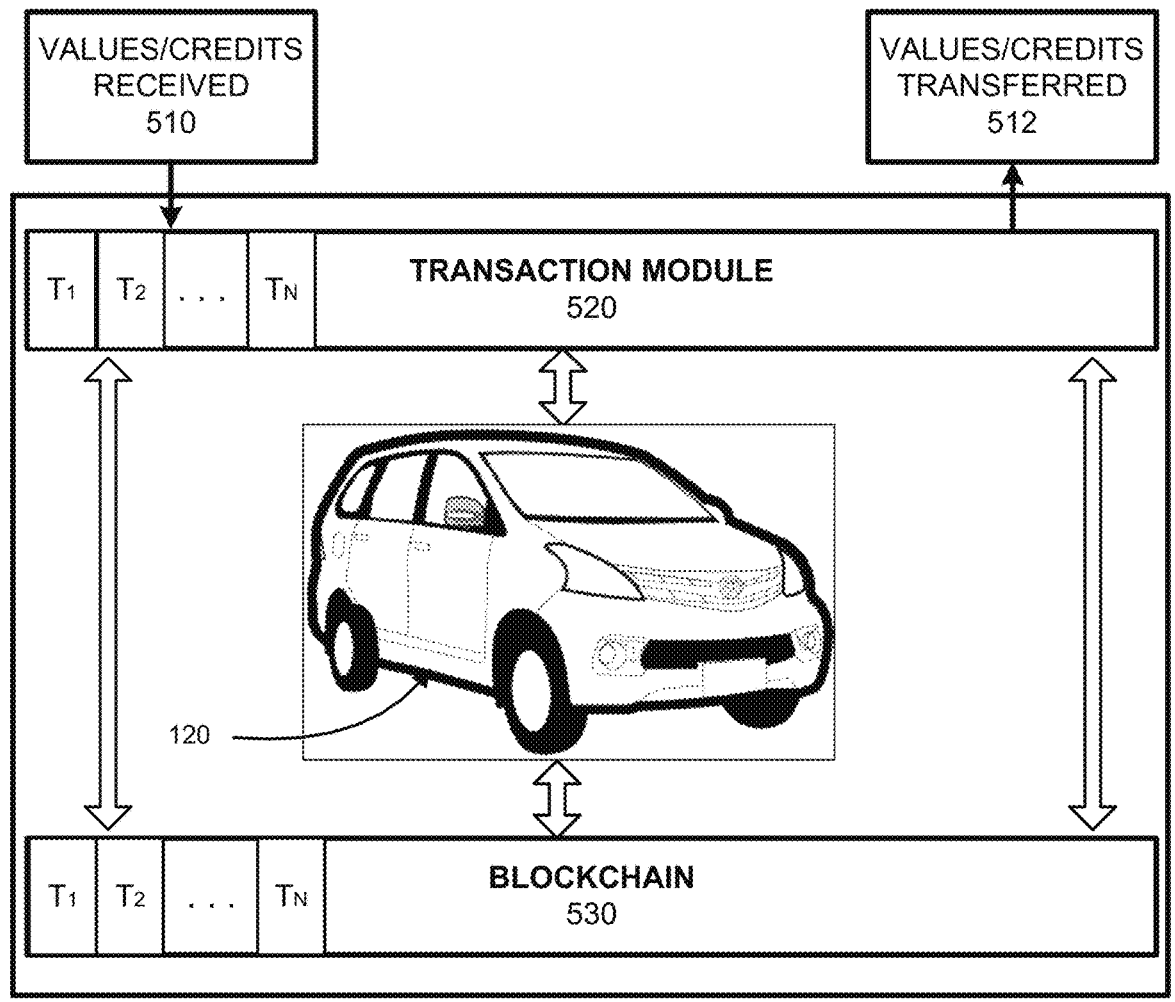
FIG. 5A illustrates an example blockchain transport configuration, according to example embodiments.

FIG. 5A illustrates an example blockchain vehicle configuration 500 for managing blockchain transactions associated with a vehicle, according to example embodiments. Referring to FIG. 5A, as a particular transport/vehicle 120 is engaged in transactions, such as service transactions (e.g., vehicle service, dealer transactions, delivery/pickup, transportation services, etc.), the vehicle may receive values 510 and/or expel/transfer values 512 according to a service transaction(s). The transaction module 520 may record information, such as parties, credits, service descriptions, date, time, location, results, notifications, unexpected events, etc. Those transactions in the transaction module 520 may be replicated into a blockchain 530 which is managed by a remote server and/or remote blockchain peers, among which the vehicle itself may represent a blockchain member and/or blockchain peer. In other embodiments, the blockchain 530 resides on the vehicle 120. When the vehicle is in use and is communicating with a data network, in one example, the data network management is performed by a remote server monitoring the data network communications with the transport 120 and via applying a user's profile to the vehicle 120 and the subsequent actions performed may be recorded in a new blockchain transaction that is created based on the vehicle use event, the vehicle's data network data, the user(s) data, applications used, etc. This may be the approach taken to record data usage and to provide compensation for the usage event (i.e., data services).

Figure 5B:
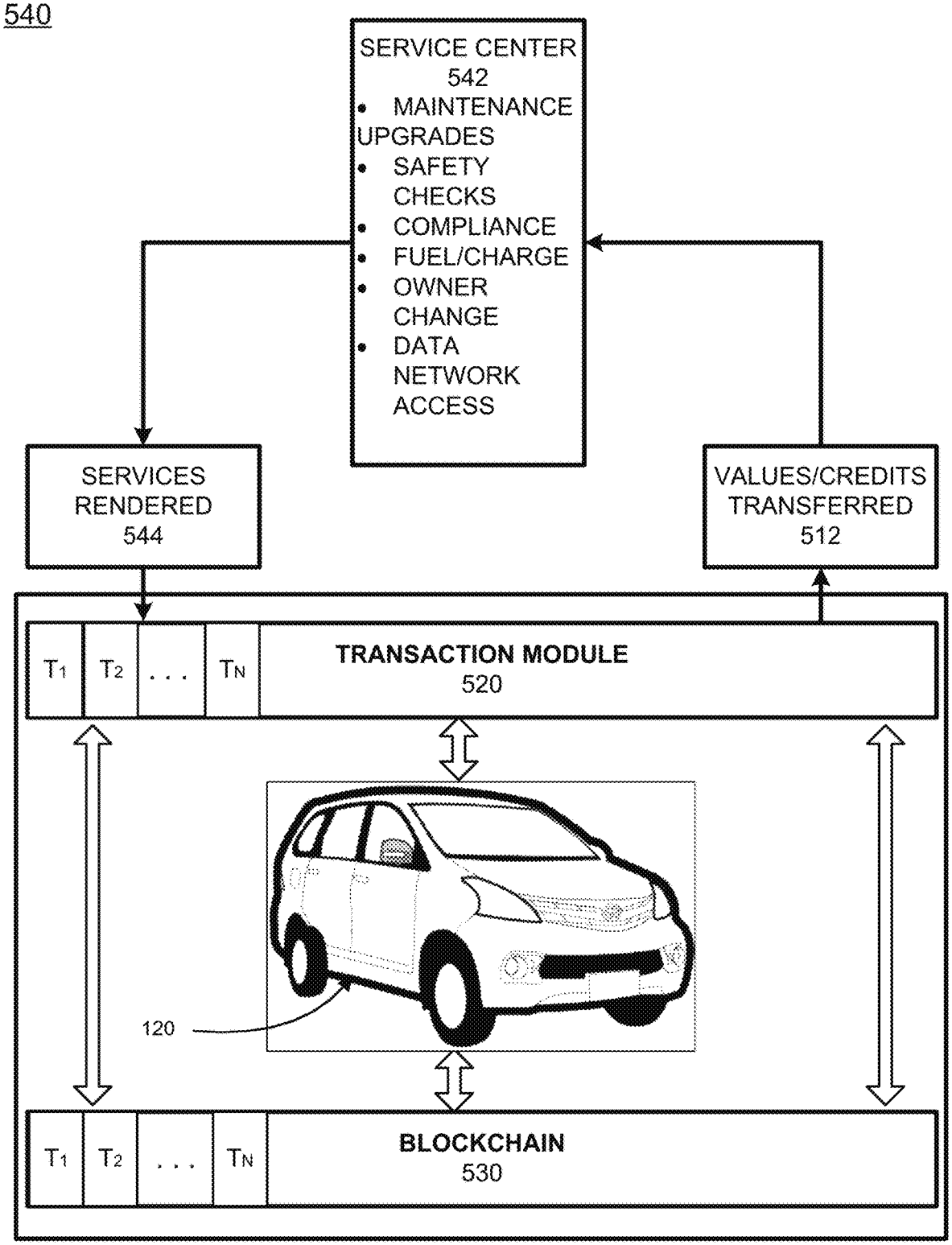
FIG. 5B illustrates another example blockchain transport configuration, according to example embodiments.

FIG. 5B illustrates an example blockchain vehicle configuration 540 for managing blockchain transactions between a service center and a vehicle, according to example embodiments. In this example, the vehicle 120 may have driven itself to a service center 542 (e.g., automotive dealer, local service stop, delivery pickup center, data service location, etc.) because the vehicle needs service, data services, and/or needs to stop at a particular location. The service center 542 may register the vehicle for a service at a particular time, with a particular strategy, such as oil change, battery charge, refuel, recharge, or replacement services, such as tire change or replacement, and any other transport related services, such as data network access. The services rendered 544 may be performed based on a smart contract which is downloaded from or accessed via the blockchain 530 and identified for permission to perform such services for a particular rate of exchange. The services are logged in the transaction log of the transaction module 520, the credits 512 are transferred to the service center 542 and the blockchain may log transactions to represent all the information regarding the recent service. In other embodiments, the blockchain 530 resides on the vehicle 120 and/or the service center 542. In one example, a transport event may require a refuel or other vehicle service and the user may then be responsible for the responsibility value increase for such a service. The service may be rendered via a blockchain notification which is then used to redistribute the responsibility value to the user profile. Adherence to a regular service schedule may be part of the adherence rate or compliance necessary to achieve an optimal user vehicle status. A service stop may/may not be a permissible action permitted by a vehicle event associated with a particular occupant/target user, depending on their status. Additionally, if the vehicle prompted a user to make a service stop, such as access a data network to download certain data, and the user refused, this inaction could cause a user status deduction and/or a vehicle condition deduction which is added to the overall user rating and/or damages list, which the user could be responsible for at the end of the event.

Figure 5C:
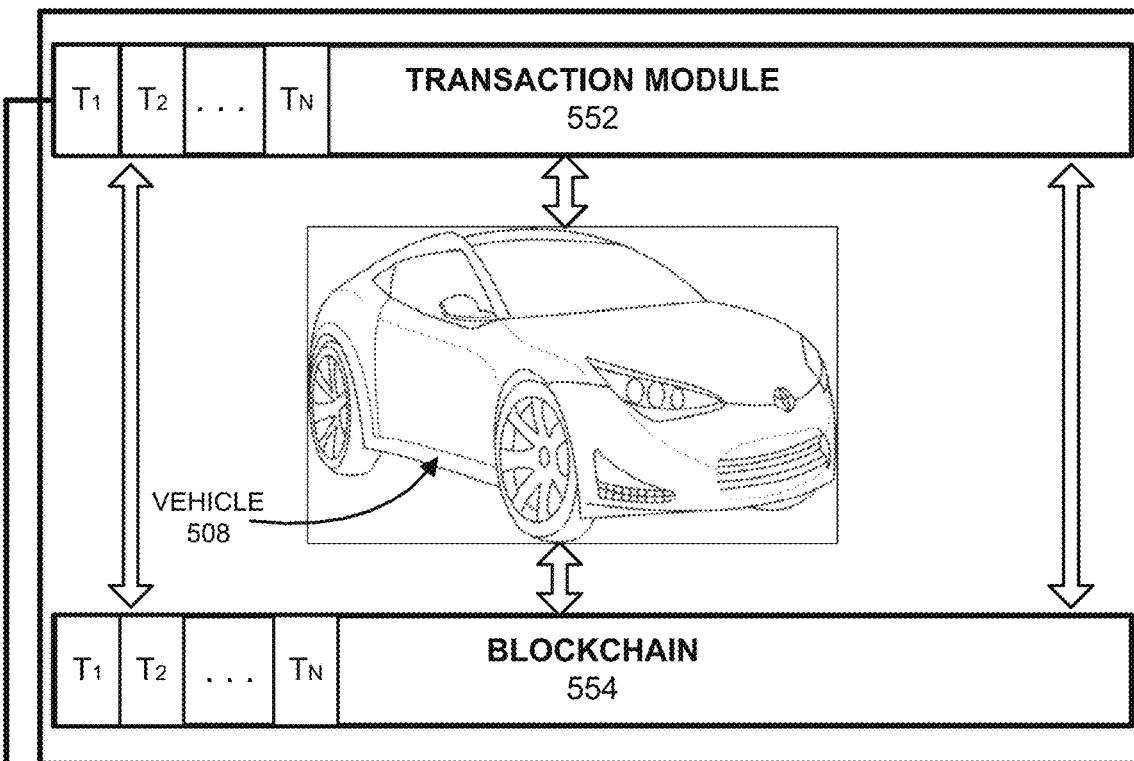
FIG. 5C illustrates a further example blockchain transport configuration, according to example embodiments.
Figure 5C:
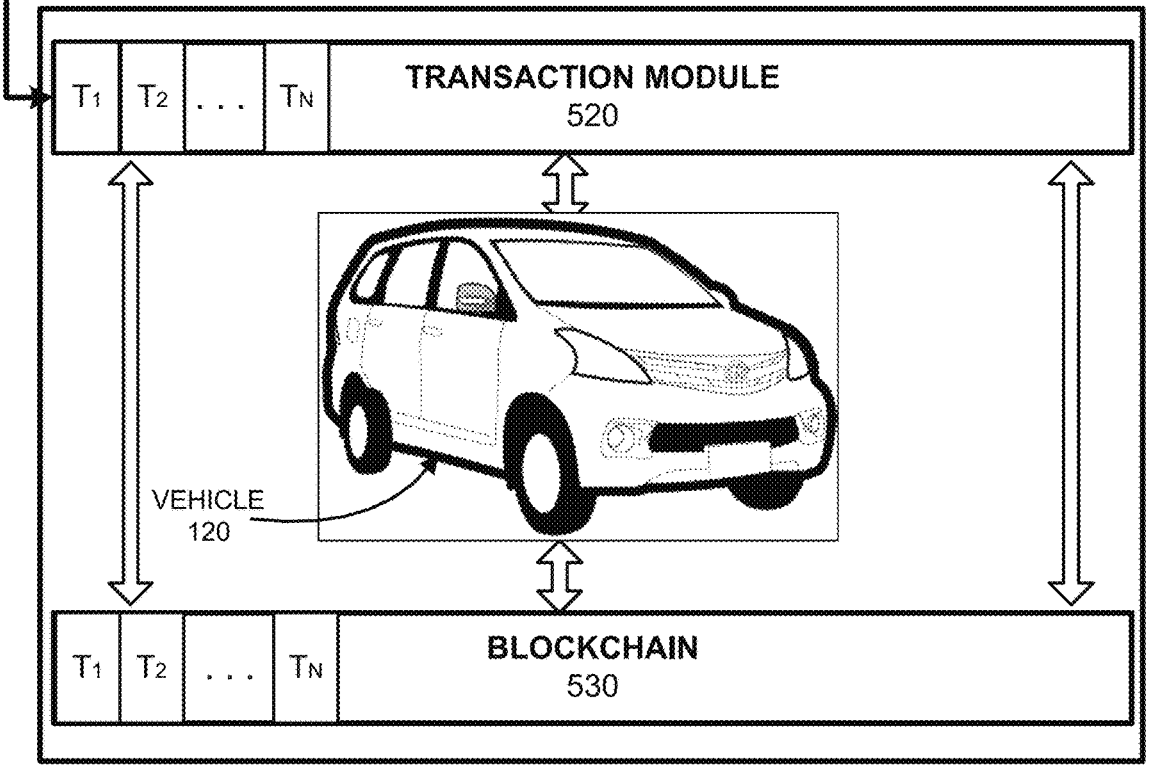

FIG. 5C illustrates an example blockchain vehicle configuration 550 for managing blockchain transactions conducted among various vehicles, according to example embodiments. The vehicle 120 may engage with another vehicle 508 to perform various actions, such as to share, transfer, acquire service calls, etc. when the vehicle has reached a status where the services need to be shared with another vehicle. For example, the vehicle 508 may be due for a battery charge and/or may have an issue with a tire and may be in route to pick up a package for delivery. The vehicle 508 may notify another vehicle 120 which is in its network and which operates on its blockchain member service. The vehicle 120 may then receive the information via a wireless communication request to perform the package pickup from the vehicle 508 and/or from a server (not shown). The transactions are logged in the transaction modules 552 and 520 of both vehicles. The credits are transferred from vehicle 508 to vehicle 120 and the record of the transferred service is logged in the blockchain 530/554 assuming that the blockchains are different from one another, or, are logged in the same blockchain used by all members. In this example, if the user was permitted to use the vehicle to perform certain services, such as passenger services, fractional ownership service requests or other services to another vehicle, or to perform similar actions, then the blockchain may use the smart contract to identify the terms of the agreement and ultimately log the transaction in the vehicle related blockchains as a result of having completed such tasks. Also, vehicle 508 may offer vehicle 120 a tethering service for data distribution to a network that a vehicle 120 may not be able to access on its own. The network usage may be tracked and logged in the vehicle blockchains.

Figure 6:
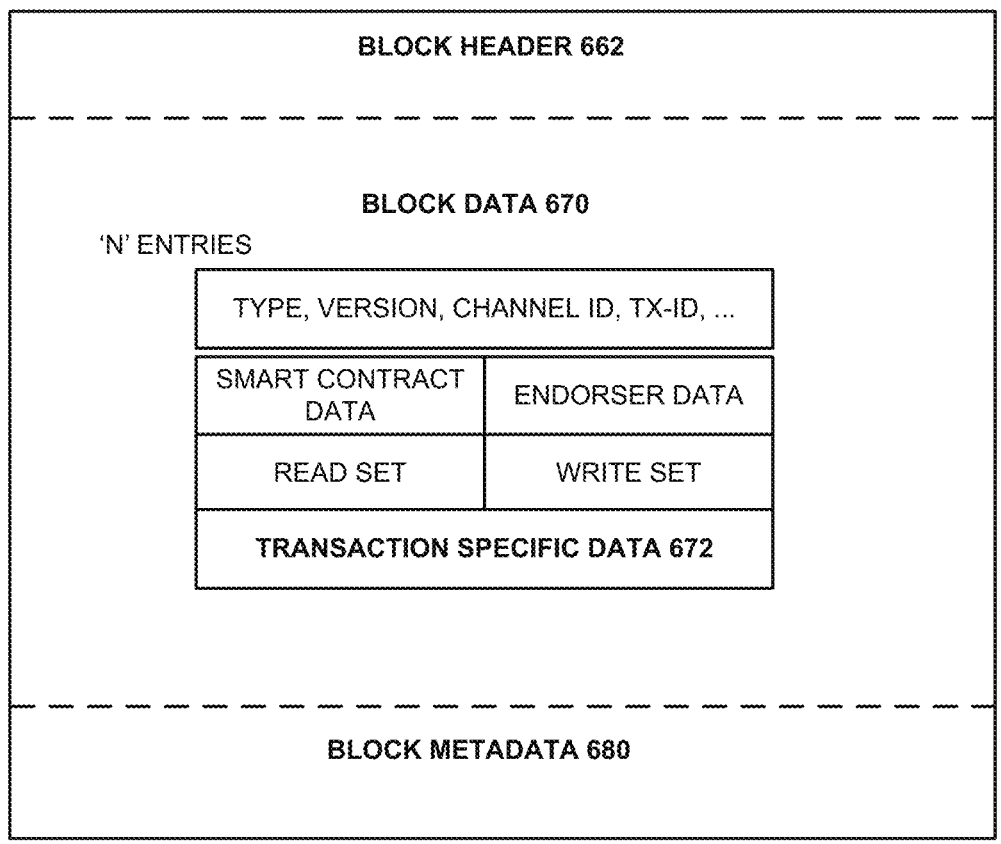
FIG. 6 illustrates an example data block, according to example embodiments.

FIG. 6 illustrates a blockchain block 600 that can be added to a distributed ledger, according to example embodiments, and contents of a block structure 660. Referring to FIG. 6, clients (not shown) may submit entries to blockchain nodes to enact activity on the blockchain. As an example, clients may be applications that act on behalf of a requester, such as a device, person or entity to propose entries for the blockchain. The plurality of blockchain peers (e.g., blockchain nodes) may maintain a state of the blockchain network and a copy of the distributed ledger. Different types of blockchain nodes/peers may be present in the blockchain network including endorsing peers which simulate and endorse entries proposed by clients and committing peers which verify endorsements, validate entries, and commit entries to the distributed ledger. In this example, the blockchain nodes may perform the role of endorser node, committer node, or both.

The instant system includes a blockchain which stores immutable, sequenced records in blocks, and a state database (current world state) maintaining a current state of the blockchain. One distributed ledger may exist per channel and each peer maintains its own copy of the distributed ledger for each channel of which they are a member. The instant blockchain is an entry log, structured as hash-linked blocks where each block contains a sequence of N entries. Blocks may include various components such as those shown in FIG. 6. The linking of the blocks may be generated by adding a hash of a prior block's header within a block header of a current block. In this way, all entries on the blockchain are sequenced and cryptographically linked together preventing tampering with blockchain data without breaking the hash links. Furthermore, because of the links, the latest block in the blockchain represents every entry that has come before it. The instant blockchain may be stored on a peer file system (local or attached storage), which supports an append-only blockchain workload.

The current state of the blockchain and the distributed ledger may be stored in the state database. Here, the current state data represents the latest values for all keys ever included in the chain entry log of the blockchain. Smart contract executable code invocations execute entries against the current state in the state database. To make these smart contract executable code interactions extremely efficient, the latest values of all keys are stored in the state database. The state database may include an indexed view into the entry log of the blockchain, it can therefore be regenerated from the chain at any time. The state database may automatically get recovered (or generated if needed) upon peer startup, before entries are accepted.

Endorsing nodes receive entries from clients and endorse the entry based on simulated results. Endorsing nodes hold smart contracts which simulate the entry proposals. When an endorsing node endorses an entry, the endorsing nodes creates an entry endorsement which is a signed response from the endorsing node to the client application indicating the endorsement of the simulated entry. The process of endorsing an entry depends on an endorsement policy which may be specified within smart contract executable code. An example of an endorsement policy is "the majority of endorsing peers must endorse the entry." Different channels may have different endorsement policies. Endorsed entries are forward by the client application to an ordering service.

The ordering service accepts endorsed entries, orders them into a block, and delivers the blocks to the committing peers. For example, the ordering service may initiate a new block when a threshold of entries has been reached, a timer times out, or another condition. In this example, blockchain node is a committing peer that has received a new data block 660 for storage on the blockchain. The ordering service may be made up of a cluster of orderers. The ordering service does not process entries, smart contracts, or maintain the shared ledger. Rather, the ordering service may accept the endorsed entries and specifies the order in which those entries are committed to the distributed ledger. The architecture of the blockchain network may be designed such that the specific implementation of 'ordering' (e.g., Solo, Kafka, BFT, etc.) becomes a pluggable component.

Entries are written to the distributed ledger in a consistent order. The order of entries is established to ensure that the updates to the state database are valid when they are committed to the network. Unlike a cryptocurrency blockchain system (e.g., Bitcoin, etc.) where ordering occurs through the solving of a cryptographic puzzle, or mining, in this example the parties of the distributed ledger may choose the ordering mechanism that best suits that network.

Referring to FIG. 6, a block 660 (also referred to as a data block) that is stored on the blockchain and/or the distributed ledger may include multiple data segments such as a block header 662, transaction specific data 672, and block metadata 680. It should be appreciated that the various depicted blocks and their contents, such as block 660 and its contents are merely for purposes of an example and are not meant to limit the scope of the example embodiments. In some cases, both the block header 662 and the block metadata 680 may be smaller than the transaction specific data 672 which stores entry data, however this is not a requirement. The block 660 may store transactional information of N entries (e.g., 100, 500, 1000, 2000, 3000, etc.) within the block data 670. The block 660 may also include a link to a previous block (e.g., on the blockchain) within the block header 662. In particular, the block header 662 may include a hash of a previous block's header. The block header 662 may also include a unique block number, a hash of the block data 670 of the current block 660, and the like. The block number of the block 660 may be unique and assigned in an incremental/sequential order starting from zero. The first block in the blockchain may be referred to as a genesis block which includes information about the blockchain, its members, the data stored therein, etc.

The block data 670 may store entry information of each entry that is recorded within the block. For example, the entry data may include one or more of a type of the entry, a version, a timestamp, a channel ID of the distributed ledger, an entry ID, an epoch, a payload visibility, a smart contract executable code path (deploy tx), a smart contract executable code name, a smart contract executable code version, input (smart contract executable code and functions), a client (creator) identify such as a public key and certificate, a signature of the client, identities of endorsers, endorser signatures, a proposal hash, smart contract executable code events, response status, namespace, a read set (list of key and version read by the entry, etc.), a write set (list of key and value, etc.), a start key, an end key, a list of keys, a Merkel tree query summary, and the like. The entry data may be stored for each of the N entries.

In some embodiments, the block data 670 may also store transaction specific data 672 which adds additional information to the hash-linked chain of blocks in the blockchain. Accordingly, the data 672 can be stored in an immutable log of blocks on the distributed ledger. Some of the benefits of storing such data 672 are reflected in the various embodiments disclosed and depicted herein. The block metadata 680 may store multiple fields of metadata (e.g., as a byte array, etc.). Metadata fields may include signature on block creation, a reference to a last configuration block, an entry filter identifying valid and invalid entries within the block, last offset persisted of an ordering service that ordered the block, and the like. The signature, the last configuration block, and the orderer metadata may be added by the ordering service. Meanwhile, a committer of the block (such as a blockchain node) may add validity/invalidity information based on an endorsement policy, verification of read/write sets, and the like. The entry filter may include a byte array of a size equal to the number of entries in the block data 670 and a validation code identifying whether an entry was valid/invalid.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 7 illustrates an example computer system architecture 700, which may represent or be integrated in any of the above-described components, etc.

Figure 7:
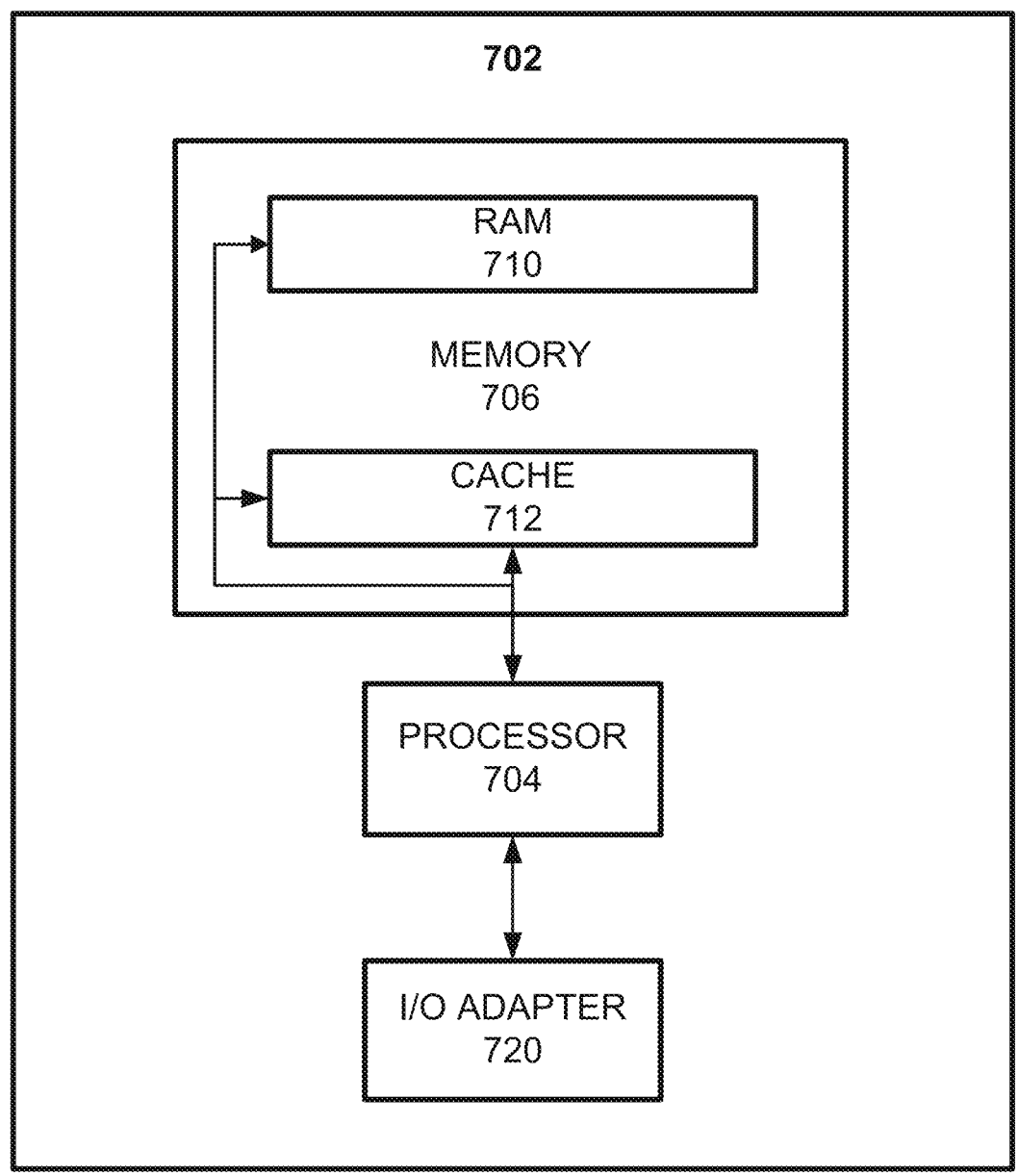
FIG. 7 illustrates an example system that can be used with one or more of the example embodiments.

FIG. 7 is not intended to suggest any limitation as to the scope of use or functionality of embodiments of the application described herein. Regardless, the computing node 700 is capable of being implemented and/or performing any of the functionality set forth herein.

In computing node 700 there is a computer system/server 702, which is operational with numerous other general purpose or special purpose computing system environments or configurations. Examples of well-known computing systems, environments, and/or configurations that may be suitable for use with computer system/server 702 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 702 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 702 in cloud computing node 700 is shown in the form of a general-purpose computing device. The components of computer system/server 702 may include, but are not limited to, one or more processors or processing units 704, a system memory 706, and a bus that couples various system components including system memory 706 to processor 704.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media. System memory 706, in one embodiment, implements the flow diagrams of the other figures. The system memory 706 can include computer system readable media in the form of volatile memory, such as random-access memory (RAM) 710 and/or cache memory 712. Computer system/server 702 may further include other removable/non-removable, volatile/non-volatile computer system storage media. By way of example only, storage system can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 706 may include at least one program product having a set (e.g., at least one) of program modules that are configured to carry out the functions of various embodiments of the application.

Program/utility, having a set (at least one) of program modules may be stored in memory 706 by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 702 may also communicate with one or more external devices via the I/O Adapter 720 such as a keyboard, a pointing device, a display, etc.; one or more devices that enable a user to interact with computer system/server 702; and/or any devices (e.g., network card, modem, etc.) that enable computer system/server 702 to communicate with one or more other computing devices. Such communication can occur via I/O interfaces. Still yet, computer system/server 702 can communicate with one or more networks such as a local area network (LAN), a general wide area network (WAN), and/or a public network (e.g., the Internet) via a network adapter. The network adapter communicates with the other components of computer system/server 702 via a bus. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
   determining a transport will lose a data network connection at a target time based on a route plan associated with a future location of the transport at the target time;
   determining an estimated amount of network down time until the transport regains the data network connection once the data network connection is lost;
   determining a period of time between a current time and the target time;
   when the period of time is below a threshold period of time, recording one or more data segments of a data service currently used in the transport, wherein the threshold period of time is based on a type of data associated with the one or more data segments and an amount of data required to occupy the estimated amount of time until the transport regains the data network connection, and wherein a size of the one or more data segments are estimated and recorded based on the estimated network down time and an estimated rate of speed of the transport; and
   initiating the recorded one or more data segments in the transport at the target time.

2. The method of claim 1, comprising:
   determining a current map position and a future map position of the transport based on the route plan;
   identifying portions of the map between the current map position and the future map position which are known to have lost data network connections; and
   determining the estimated amount of network down time based on one or more distances associated with the identified portions of the map.

3. The method of claim 1, wherein recording the one or more data segments further comprises recording a first data segment of the data service currently used in the transport and a second data segment comprising content that is contextually related to the first data service, and wherein the second data segment is approximately a same amount of data as the amount of data of the first data segment, and wherein when at least one of the first and second data segments have completed, initiating a data service via the data network connection.

4. The method of claim 1, comprising:
   retrieving a smart contract from a distributed ledger;
   invoking the smart contract when the transport is determined to lose the data network connection at the target time; and
   determining, from the smart contract, the estimated amount of network down time based on the route plan.

5. The method of claim 1, comprising:
   creating a blockchain transaction comprising a date associated with the lost data network connection, a time the transport lost access to the data network, a time the transport regained access to the data network, a location of the transport prior to losing access to the data network, a location of the transport after regaining access to the data network; and
   storing the blockchain transaction in a distributed ledger.

6. A system, comprising:
   a transport; and
   a server configured to determine a transport will lose a data network connection at a target time based on a route plan associated with a future location of the transport at the target time;
   determine an estimated amount of network down time until the transport regains the data network connection once the data network connection is lost;
   determine a period of time between a current time and the target time;
   when the period of time is below a threshold period of time, record one or more data segments of a data service currently used in the transport, wherein the threshold period of time is based on a type of data associated with the one or more data segments and an amount of data required to occupy the estimated amount of time until the transport regains the data network connection, and, wherein a size of the one or more data segments are estimated and recorded based on the estimated network down time and an estimated rate of speed of the transport; and initiate the recorded one or more data segments in the transport at the target time.

7. The system of claim 6, wherein the server is further configured to determine a current map position and a future map position of the transport based on the route plan;

identify portions of the map between the current map position and the future map position which are known to have lost data network connections; and determine the estimated amount of network down time based on one or more distances associated with the identified portions of the map.

8. The system of claim 6, wherein the one or more recorded data segments further comprises the server configured to record a first data segment of the data service currently used in the transport and a second data segment comprising content that is contextually related to the first data service, and wherein the second data segment is approximately a same amount of data as the amount of data of the first data segment, and wherein when at least one of the first and second data segments have completed, initiate a data service via the data network connection.

9. The system of claim 6, wherein the server is further configured to retrieve a smart contract from a distributed ledger;

invoke the smart contract when the transport is determined to lose the data network connection at the target time; and determine, from the smart contract, the estimated amount of network down time based on the route plan.

10. The system of claim 6, wherein the server is further configured to create a blockchain transaction comprising a date associated with the lost data network connection, a time the transport lost access to the data network, a time the transport regained access to the data network, a location of the transport prior to losing access to the data network, a location of the transport after regaining access to the data network; and store the blockchain transaction in a distributed ledger.

11. A non-transitory computer readable storage medium configured to store instructions that when executed cause a processor to perform:

determining a transport will lose a data network connection at a target time based on a route plan associated with a future location of the transport at the target time;

determining an estimated amount of network down time until the transport regains the data network connection once the data network connection is lost;

determining a period of time between a current time and the target time;

when the period of time is below a threshold period of time, recording one or more data segments of a data service currently used in the transport, wherein the threshold period of time is based on a type of data associated with the one or more data segments and an amount of data required to occupy the estimated amount of time until the transport regains the data network connection, and wherein a size of the one or more data segments are estimated and recorded based on the estimated network down time and an estimated rate of speed of the transport; and initiating the recorded one or more data segments in the transport at the target time.

12. The non-transitory computer readable storage medium of claim 11, wherein the processor is further configured to perform:

determining a current map position and a future map position of the transport based on the route plan;

identifying portions of the map between the current map position and the future map position which are known to have lost data network connections; and determining the estimated amount of network down time based on one or more distances associated with the identified portions of the map.

13. The non-transitory computer readable storage medium of claim 11, wherein recording the one or more data segments further comprises recording a first data segment of the data service currently used in the transport and a second data segment comprising content that is contextually related to the first data service, and wherein the second data segment is approximately a same amount of data as the amount of data of the first data segment, and wherein when at least one of the first and second data segments have completed, initiating a data service via the data network connection.

14. The non-transitory computer readable storage medium of claim 11, wherein the processor is further configured to perform:

retrieving a smart contract from a distributed ledger;

invoking the smart contract when the transport is determined to lose the data network connection at the target time;

determining, from the smart contract, the estimated amount of network down time based on the route plan.

* * * * *